United States Patent [19]

Waller

[11] Patent Number: 4,979,406
[45] Date of Patent: Dec. 25, 1990

[54] CAM WITH SINUSOIDAL CAM LOBE SURFACES

[75] Inventor: Francis E. Waller, Oldsmar, Fla.

[73] Assignees: Walter J. Monacelli, a part interest; William J. Gdovin, both of St. Petersburg, Fla. ; a part interest

[21] Appl. No.: 139,294

[22] Filed: Dec. 29, 1987

Related U.S. Application Data

[60] Continuation-in-part of Ser. No. 920,459, Oct. 20, 1986, which is a continuation-in-part of Ser. No. 761,486, Aug. 1, 1985, abandoned, which is a continuation-in-part of Ser. No. 628,995, Jul. 9, 1984, abandoned, which is a continuation-in-part of Ser. No. 582,261, Feb. 22, 1984, abandoned, which is a continuation-in-part of Ser. No. 420,390, Sep. 20, 1982, abandoned, which is a division of Ser. No. 320,213, Nov. 12, 1981, Pat. No. 4,432,310, which is a continuation-in-part of Ser. No. 265,259, May 19, 1981, abandoned, which is a continuation of Ser. No. 35,553, May 3, 1979, abandoned.

[51] Int. Cl.$^5$ .............................................. F16H 53/00
[52] U.S. Cl. ..................................................... 74/567
[58] Field of Search ................. 74/56, 57, 567, 568 R, 74/568 FS, 568 M, 568 T, 569; 123/43 AA, 43 AB, 58 R, 58 AA

[56] References Cited

U.S. PATENT DOCUMENTS

| | | | |
|---|---|---|---|
| 1,229,009 | 5/1917 | Allison | 123/58 AB |
| 1,352,985 | 9/1920 | Murphy | 123/58 AB |
| 1,487,338 | 3/1924 | Kelley | 123/58 AB |
| 1,802,902 | 4/1931 | Brau | 123/58 AB |
| 1,867,504 | 7/1932 | Franklin | 123/58 AB |
| 2,027,076 | 1/1936 | Volliman | 123/58 AB |
| 2,237,621 | 4/1941 | Herrmann | 123/58 AB |
| 2,237,989 | 4/1941 | Herrmann | 123/58 AB |
| 2,243,817 | 5/1941 | Herrmann | 123/58 AB |
| 2,243,818 | 5/1941 | Herrmann | 123/58 AB |
| 2,243,819 | 5/1941 | Herrmann | 123/58 AB |
| 2,243,820 | 5/1941 | Herrmann | 123/58 AB |
| 2,243,821 | 5/1941 | Herrmann | 123/58 AB |
| 2,243,822 | 5/1941 | Herrmann | 123/58 AB |
| 2,966,899 | 1/1961 | Herrmann | 123/58 AB |
| 3,374,685 | 3/1968 | Eheim | 74/56 |
| 3,456,630 | 7/1969 | Karlan | 123/58 AB |
| 4,090,478 | 5/1978 | Trimble | 123/58 R |
| 4,432,310 | 2/1984 | Waller | 74/567 |
| 4,638,547 | 1/1987 | Waller | 409/122 |
| 4,639,173 | 1/1987 | Waller | 409/122 |

FOREIGN PATENT DOCUMENTS

| | | | |
|---|---|---|---|
| 17074 | 4/1881 | Fed. Rep. of Germany . | |
| 137280 | 1/1901 | Fed. Rep. of Germany . | |
| 861625 | 11/1940 | France . | |
| 1286129 | 1/1962 | France | 74/567 |
| 58995 | 8/1911 | Switzerland . | |
| 126887 | 7/1927 | Switzerland | 74/567 |
| 251607 | 4/1926 | United Kingdom | 123/58 AA |
| 891241 | 3/1962 | United Kingdom | 74/567 |

OTHER PUBLICATIONS

Physics, Halliday & Resnick, John Wiley & Sons Publisher, Second Printing, 4/1967 Library of Congress Catalog #66-11527, p. 351.

Primary Examiner—Vinh T. Luong
Attorney, Agent, or Firm—Walter J. Monacelli

[57] ABSTRACT

This cam has a cam lobe having opposite sinusoidal surfaces which have two rises and two reverse rises or two dips in 360° of each sinusoidal surface with the rises in one such surface being opposite to the reverse rises in the other such surface, which sinusoidal surfaces will have full, centerline contact with a pair of bearings attached to the same connecting rod connected to a pair of pistons, these bearings being on opposite sides of the cam lobe and at one time being driven in one direction by one of the two pistons in each pair and then at another time in the opposite direction by the other piston in that pair. The surfaces of the cam lobe avoid friction or binding between the cam lobe surfaces and across the width of each bearing continuously through each revolution of the cam and of each bearing.

6 Claims, 12 Drawing Sheets

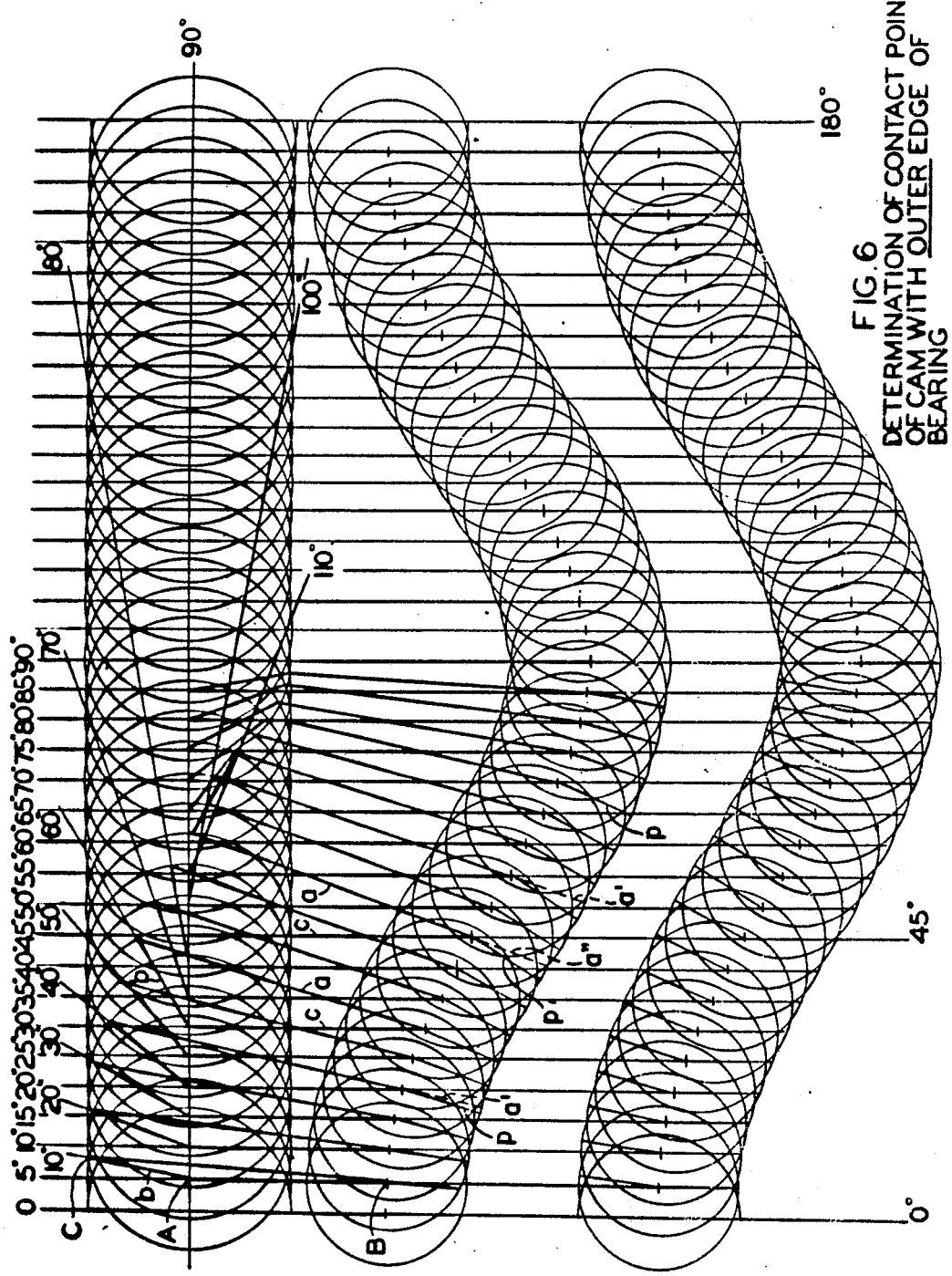
FIG. 6 DETERMINATION OF CONTACT POINTS OF CAM WITH OUTER EDGE OF BEARING

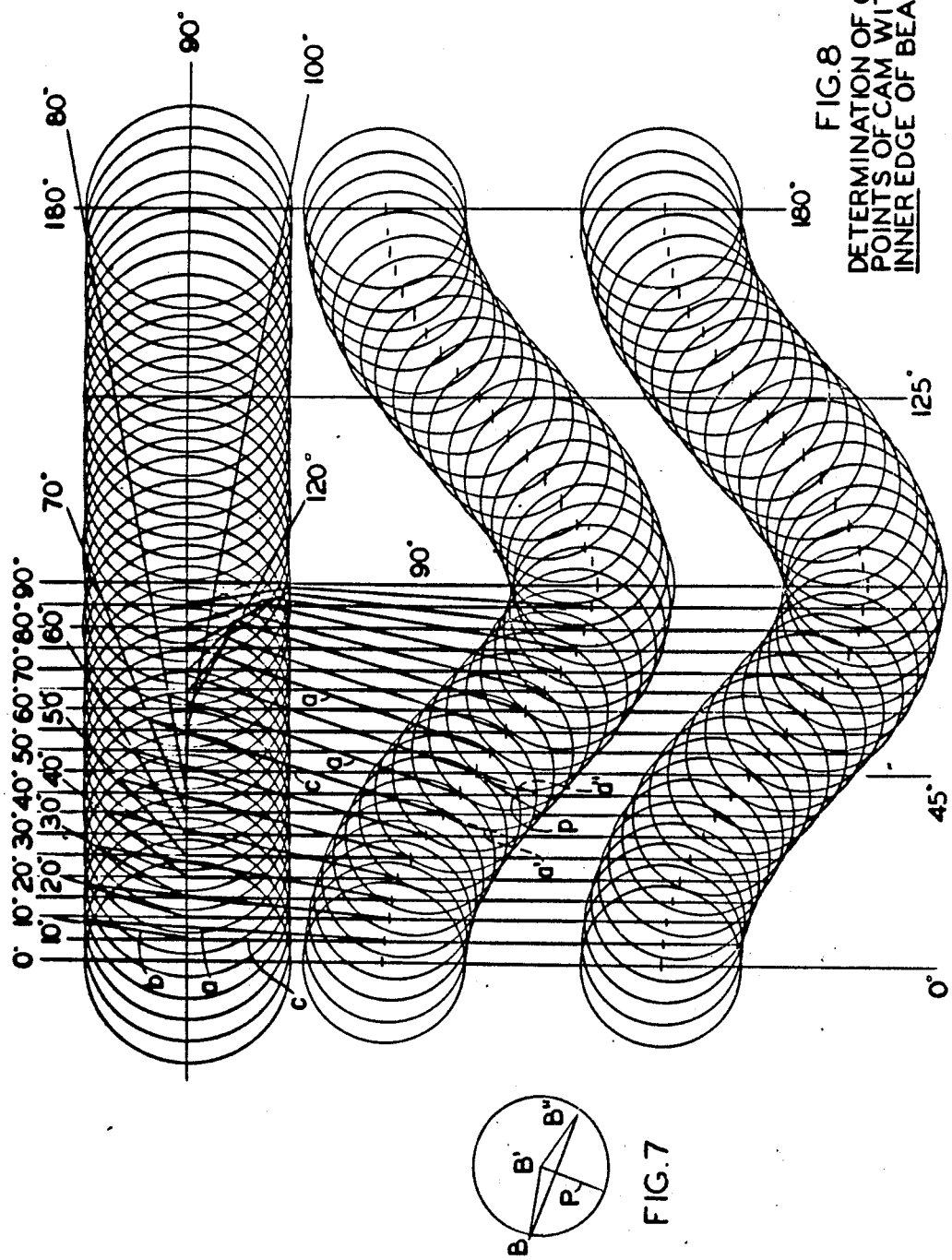

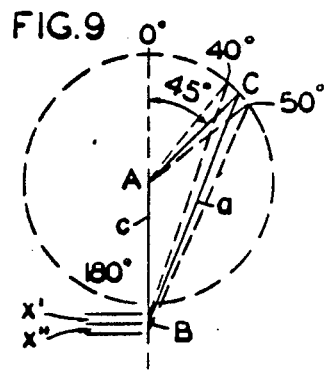
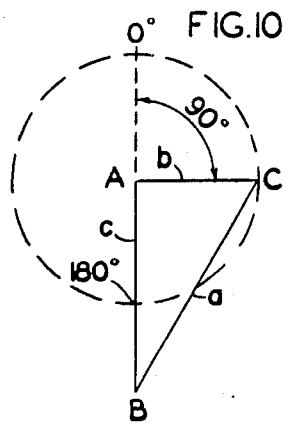
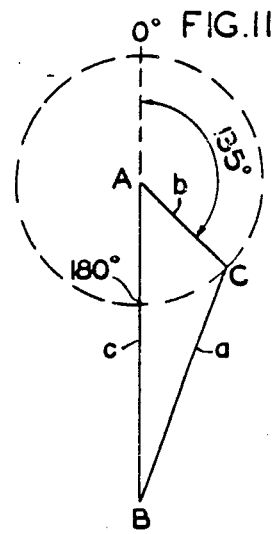
FIG. 9   FIG. 10   FIG. 11
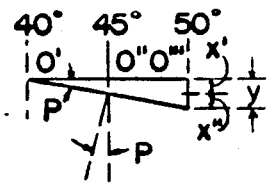
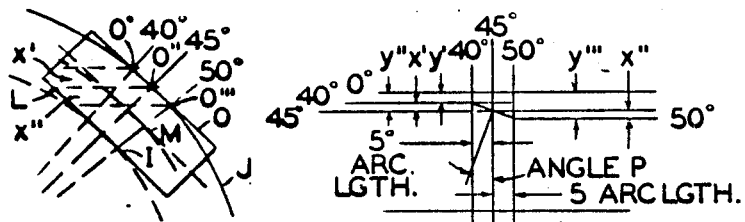
FIG. 12   FIG. 13
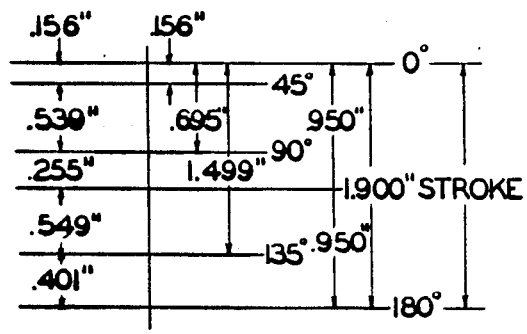
FIG. 14
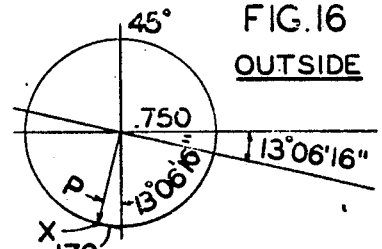
FIG. 16
OUTSIDE
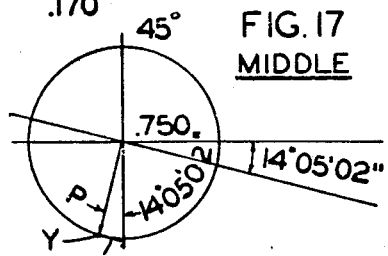
FIG. 17
MIDDLE
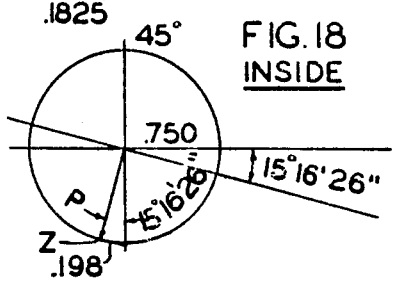
FIG. 18
INSIDE
FIG. 15

FIG.23a 0° 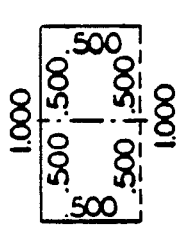
FIG.23b 22.5° 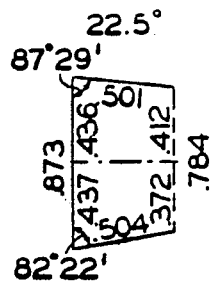
FIG.23c 45° 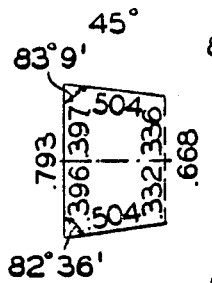
FIG.23d 67.5° 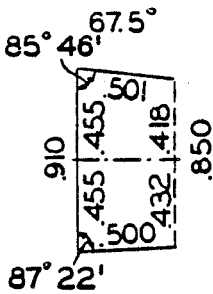
FIG.23e 90° 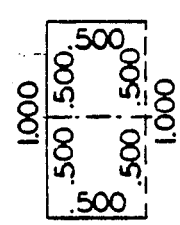
FIG.23f 112.5° 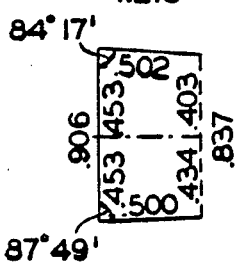
FIG.23g 135° 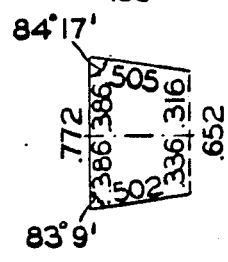
FIG.23h 157.5° 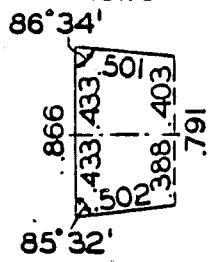
FIG.23i 180° 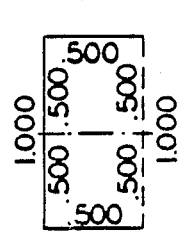
FIG.24a (PRIOR ART) 0° 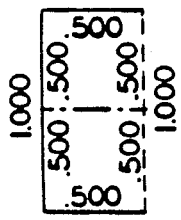
FIG.24b (PRIOR ART) 22.5° 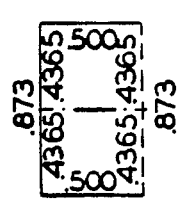
FIG.24c (PRIOR ART) 45° 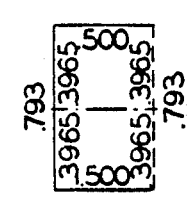
FIG.24d (PRIOR ART) 67.5° 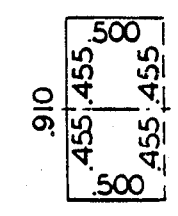
FIG.24e (PRIOR ART) 90° 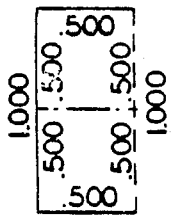
FIG.24f (PRIOR ART) 112.5° 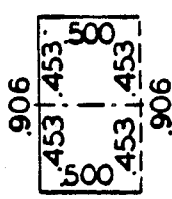
FIG.24g (PRIOR ART) 135° 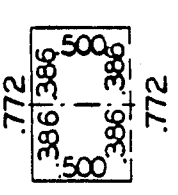
FIG.24h (PRIOR ART) 157.5° 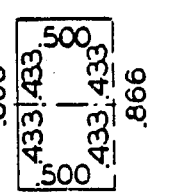
FIG.24i (PRIOR ART) 180° 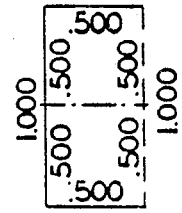

| CRANKSHAFT TRAVEL (4" STROKE) | MEASURE OF STROKE | | PER CENT OF STROKE | TRAVEL OF WALLER CAM DESIGNED TO DUPLICATE CRANKSHAFT OPERATION (4" STROKE) |
|---|---|---|---|---|
| DEGREES | | | | DEGREES |
| 0° | | | | 0° |
| 30° | .196" | | 4.90% | 15° |
| | .586" | | 14.65% | |
| 60° | | | | 30° |
| | .926" | | 23.15% | |
| 90° | | | | 45° |
| | 1.074" | 4" | 26.85% | |
| 120° | | | | 60° |
| | .878" | | 21.95% | |
| 150° | | | | 75° |
| 180° | .340 | | 8.50% | 90° |

FIG. 25

CAM WITH SINUSOIDAL CAM LOBE SURFACES

CROSS REFERENCES TO RELATED APPLICATIONS

This application is a continuation-in-part of pending U.S. patent application Ser. No. 920,459, filed Oct. 20, 1986 which is a continuation-in-part of application U.S. patent application Ser. No. 06/761,486, filed Aug. 1, 1985, now abandoned, which is a continuation-in-part of application U.S. patent application Ser. No. 06/628,995 filed July 9, 1984, now abandoned, which is a continuation-in-part of U.S. patent application Ser. No. 582,261, filed Feb. 22, 1984, now abandoned, which is a continuation-in-part of U.S. patent application Ser. No. 420,390, filed Sept. 20, 1982, now abandoned, which is a division of U.S. patent application Ser. No. 320,213 filed Nov. 12, 1981 now U.S. patent application No. 4,432,310 issued Feb. 21, 1984, which is a continuation-in-part of U.S. patent application Ser. No. 265,259 filed May 19, 1981, now abandoned, which in turn is a continuation of U.S. patent application Ser. No. 035,553 filed May 3, 1979, now abandoned.

BACKGROUND OF THE INVENTION

1. Field of the Invention

This invention relates to a new type cam suitable for use in a parallel piston engine. More specifically the cam is adapted to fit into a circular arrangement of pistons and cylinders around a mainshaft, which pistons act in concert to effect rotation of the mainshaft by virtue of pressure exerted on the sinusoidal surface of the cam lobe encircling the mainshaft. Still more specifically the cam surface is specially designed to avoid friction and binding between the bearings and cam surface.

2. State of the Prior Art

Various types of engines for developing mechanical power, such as for propelling vehicles, have been proposed and are in use. The most commonly used is the internal combustion engine. However, in spite of their widespread use, there are a number of disadvantages in the types of engines used, namely, vibration, low efficiency, pollution, etc.

Vibration is generally due to the type of arrangement of the pistons with relation to the drive shaft, which in combination with poor timing, unequal power distribution, etc., is very inefficient in eliminating vibration although much has been done in absorbing vibration or otherwise eliminating its transmission to the passenger-riding portion of an automobile.

Since rotary engines may have pistons equally spaced around the mainshaft through which power is transmitted, it is conceivable that such engines might have less problems with vibration.

In U.S. patent application Ser. No. 920,459, the claims were rejected on the basis of Swiss Pat. No. 126,887 (1927) which shows a cam plate having been made from a plate fixed at a 45° angle to the shaft 3 on which it is mounted by means of hub 2 as illustrated in FIG. 1 of the patent. The last sentence on page 1 of the patent refers to the "oval cam plate". FIGS. 36a, 36b and 36c illustrate the configuration of a circular plate 114 fixed at a 45° angle to axle 115 by means of hub 116, the top and end views show the plate in oval or elliptical configuration. In fact the radius of the plate can be the hypotenus cc of an equilateral triangle having sides aa and bb of equal length. Therefore the dimensions of the oval plate can be calculated. For example, with a plate having a radius of 4 inches and the square of the hypotenus equal to the sum of the squares of the two sides this calculates to $4^2 = (aa)^2 + (bb)^2$, or since $aa = bb, = 2(aa)^2$, and then $16 = 2(aa)^2$ or $8 = (aa)^2$ and the length of aa and of bb equals $\sqrt{8}$ or 2.828. The oval shape referred to in the Swiss patent is shown by the views in FIGS. 36a and 36c.

The only description in the Swiss patent for converting the plate as illustrated in present FIGS. 36a, 36b and 36c to the structure of the Swiss patent is in the third last paragraph prior to the claims for which the translation reads: "For the actual production of such precisely conforming contact surfaces it is possible to use, e.g., a lathe made according to FIG. 4. The raw molded cam plate is clamped by its shaft 3 between tailstock and headstock. On the draw spindle 14, a conical wheel 15 is firmly attached which engages a conical wheel 17, provided with a crankpin 16 and set into the lathe bed. The pin 16 engages a slit 19 of the support 18 on which the tool carrier 20 is attached by means of a separately driven, turning tool 21, the cutters of which are at a distance from their turning axis equal to the radius of the rollers, for which the contact surface to be made is designed. The transmission ratio between the shaft 3 and the conical wheel 17 is chosen such that both make the same number of rotations, or that per rotation of the shaft 3 there is one back and forth motion by the tool 21. In this manner the relative motion between the two parts, which occurs during the operation of the rollers on the finished cam plate, is fully copied, so that the tool produces the required distorted helicoidal surface along the edge of the plate. The processing of the two contact surfaces of the cam plate can suitably be done separately."

This description relates only to the conversion of the flat surface of the plate to the helicoidal surfaces 117 and 118 of the plate. Consequently the cam plate does not have the circular or cylindrical configuration of FIG. 3. Since no description of a method or an apparatus has been shown for converting the oval shape to a circular or cylindrical shape, we can only assume that the oval shape still exists. Just referring to it as a cylindrical shape does not change it from an oval to a circular or cylindrical shape.

More important is the fact that the cam plate described by the Swiss patent has only one rise and one reverse rise. The one rise is derived from that portion of the plate in FIG. 36b which extends above the axis of rotation and the reverse rise is derived from the opposite portion of the plate which extends below the axis of rotation. There is no way that a second rise or a second reverse rise could be derived from this plate. It cannot be argued, therefore, that it would be obvious to add a second rise and a second reverse rise. It is necessary to start with an entirely different structure and a different procedure to prepare the cam of applicant's invention.

A number of patents and other reference have been cited in parent and corresponding foreign applications. These include U.S. Pat. Nos. 1,197,896; 1,229,009; 1,351,365; 1,352,985; 1,487,338; 1,802,902; 1,867,504; 1,971,121; 2,027,076; 2,050,127; 2,237,621; 2,237,989; 2,243,817; 2,243,818; 2,243,819; 2,284,319; 2,966,899; 3,225,659; 3,374,695; 3,456,630; 3,726,183; and 4,090,478; British Pat. Nos. 251,607 (1926), 831,241 (1962) and 891,241; French Pat. Nos. 861,625(1939), 1,286,123 (1962) and 1,286,129 (1962); Swiss Pat. Nos.

58,995 (1911) and 126,887 (1927); and German Pat. Nos. 17,074 (1881) and 137,280 (1901); and Getriebtachnik by J. Vollmer, VEB Verlag Technik Berlin, pages 1–8 and 391–403. Some of these references describe engines in which pistons are arranged parallel to a mainshaft which is driven by a cam rotated by the action of the pistons. However none of these have met with commercial success. The lack of commercial success of the engines shown in these patents is believed to be due to a number of defects therein in which the designs do not provide for centerline thrust between the pistons, bearings and cam surface and the cam surfaces are not designed to avoid friction and binding between the bearings and the cam surfaces. Some of these references describe methods of making sinusoidal cams by tracing or duplicating a master cam. The difficulties and problems of making an original or master cam are described by above cited U.S. Pat. No. 3,726,183. The method of making an original or master sinusoidal cam is described in pages 693–710 of the 21st edition of "Machinery's Handbook" published 1981 by Industrial Press Company of 200 Madison Avenue, New York, N.Y. 10157. As will be noted this is a complicated, cumbersome method.

SUMMARY OF THE INVENTION

In accordance with the present invention, a parallel cylinder engine using the am of this invention operates with excellent fuel efficiency, little or no vibration, a minimum of exhaust pollution and a reduction of friction and freedom of binding between bearings and cam surfaces. This engine has multiple pistons and cylinders arranged parallel to and in a circle around a mainshaft. The pistons and cylinders are arranged in pairs, each pair having a common axis with a connecting rod connecting the two pistons. In a 2-cycle engine, one of the pistons in the pair goes through a firing cycle while its partner goes through a compression cycle an the two operate sequentially to drive the connecting rods back and forth along the common axis of the two cylinders.

In a preferred modification, each connecting rod has attached to it a pair of roller bearings each of which alternately presses and rides against a cam lobe encircling the mainshaft as shown in U.S. Pat. No. 4,432,310.

In this preferred modification, this cam lobe has two sinusoidal surfaces each having two symmetrically disposed high points or rises, and 90° from these high points there are corresponding low points or reverse rises with curved portions connecting these respective points. In other words, this cam lobe has two rises or high points 180° from each other and 90° from each high point there is a corresponding low point or a high point in the opposite direction (reverse rise) with curved sections connecting adjacent high and low points. While the surfaces of the cam lobe are sinusoidal, they are not parallel to each other since the thickness of the cam lobe varies between the rises as explained in greater detail hereinafter. Moreover, as explained hereinafter, the sinusoidal curves differ in slope from the outer edge of the cam surface bearing-contact area as compared to the inner edge of the cam surface bearing-contact area, and also with respect to the center of the bearing-contact area, as explained hereinafter.

When a connecting rod moves in one direction in the path of its linear axis, one of the bearings carried by this connecting rod presses on the curved surface between a high and low point on the cam lobe, and by vector force, causes rotation of the mainshaft. In the automotive industry, a stroke of the piston or rod from one extreme position to its extreme position in the opposite direction is known as a stroke or cycle. Thus in going through intake, compression, power and exhaust, the piston and connecting rod goes through four strokes or cycles. With an engine having eight pairs of cylinders and pistons or 16 individual cylinders and pistons, there are 16 firings per revolution of the shaft which translates to 4 cycles per piston in one revolution of the mainshaft, and which results in a very smooth power transmission to the shaft with little or no vibration and with high efficiency.

An important feature of an engine using this cam is that the cam surface is designed to compensate for the friction and binding that results when a cylindrical bearing is rotated on a surface while the axis of the bearing is maintained in a position with its axis projected at a 90° angle to the axis of the mainshaft. Thus the outer edge of the bearing travels a path on the cam surface which has a greater circumferential distance than the path traveled by the inner edge of the bearing. However, since the two edges are on the same cylindrical surface, points on the outer edge must travel the same distance as respective points on the inner edge. Therefore, in view of these differences in the circumferential paths of the two edges on the cam surface, friction and binding develops as the bearing is rotated. The cam of this invention has a novel surface design which compensates for this difference and by a "ratio compensation" design of this surface, avoids the friction and binding which otherwise develops. In this design, the centerline of the area of contact of the cam with a bearing is a sinusoidal curve whereas the lines of contact of the cam with the outer edge and inner edge of the bearing define lines respectively which are also sinusoidal curves but different from the centerline sinusoidal curve in that the outer sinusoidal curve has a lesser slope and the inner sinusoidal curve has a steeper slope relative to the centerline sinusoidal curve. This arrangement compensates by equalizing the ratio of the travel distance of the inner and outer edges of the bearing.

The cam described and claimed is considered novel. The engine in which this cam is used is described and claimed in applicant's U.S. Pat. No. 4,432,310 issued Feb. 21, 1984. The process and apparatus for making the cam of this invention are described and covered in applicant's U.S. Pat. Nos. 4,638,547 and 4,639,173 respectively both issued on Jan. 27, 1987.

The engine in which this cam is used has important advantages. First, as stated above, there are 16 firings per revolution of the mainshaft with four cycles or strokes for each piston whereas with the present 8 cylinder engine, there are only two cycles per revolution of the crankshaft.

Second, the distance of the contact point of the connecting rod bearing with the cam lobe to the axis of the mainshaft exceeds the stroke of the piston thereby giving improved leverage and requiring less power to turn the mainshaft as compared to present engines.

Third, because of the higher number of cylinder firings permitted per revolution, this new engine design can use a lower compression ratio. Consequently, low octane fuel may be used efficiently. Moreover, a higher air ratio or leaner mixture can be used thereby resulting in more efficient use of fuel.

Fourth, since the engine is more compact in design, the size and weight of the engine may be very much smaller as compared to the present engines. For example, for comparable power production, this engine will weigh one-fourth less than the standard present engines.

Fifth, the engine design lends itself to the use of various fuels such as gasoline, diesel fuel and is even adaptable to the use of steam.

Sixth, the engine can be air-cooled, in which case blades may be attached to the mainshaft to propel air through cooling fins or other suitable means.

Seventh, the cam plate design of this new engine permits increased travel for the lifter cam and thereby decreases the amount of spring pressure needed for valve closing and gives infinite variations in valve operation, including duration of lifts, etc.

Moreover, other advantages will become obvious upon detailed description of the invention.

BRIEF DESCRIPTION OF THE DRAWINGS

The description of the engine of this invention is facilitated by reference to the drawings in which:

FIG. 1' is an enlarged isolated view of a piston of FIG. 1.

FIG. 6 represents a diagram method of applying progressively the data collected by the diagrams of FIGS. 1-5 to determine the configuration of the sinusoidal curve of a cam of this invention which is in contact with the outer edge of a bearing.

FIG. 7 is a diagram showing how a contact point of a bearing with the cam surface is determined.

FIG. 8 represents a similar diagram method as in FIG. 6 except that this is designed to determine the configuration of sinusoidal curve of the cam at those points which are in contact with the inner edge of a bearing.

FIG. 9 is a top view of a bearing superimposed on a cam at angles of 40°, 45° and 50°.

FIGS. 10 and 11 are other views similar to FIG. 9 in which the positions of line AC are at angles of 90° and 135° C. respectively.

FIG. 12 is an enlarged top view of a bearing superimposed on a portion of a cam.

FIG. 13 is an enlarged top view showing the distances that center of a bearing travels at various angles.

FIG. 14 is a triangular representation of lines shown in FIGS. 12 and 13.

FIG. 15 is a planar representation of the distances travelled in a stroke.

FIGS. 16, 17 and 18 are representations of the contact points of a bearing with the cam at the outside, middle and inside of the bearing.

FIGS. 23a through 23i represent cross-sections of the bearing-contact portion of the cam of this invention cut by planes coinciding with the centerline of the mainshaft and extending to the exterior of the cam at angles 0°, 22.5°, 45°, 67.5° and 90° respectively.

FIGS. 24a through 24i represent cross-sections of a cam cut as in FIGS. 24a through 24i having sinusoidal curves but not the ratio compensating features of the present invention.

FIG. 25 is a chart comparing operation of a crankshaft engine with an engine using a preferred cam of this invention.

FIG. 26 is another representation of the truncated substantially trapezoid construction shown as FIGS. 22c and 22a.

Figure 1:
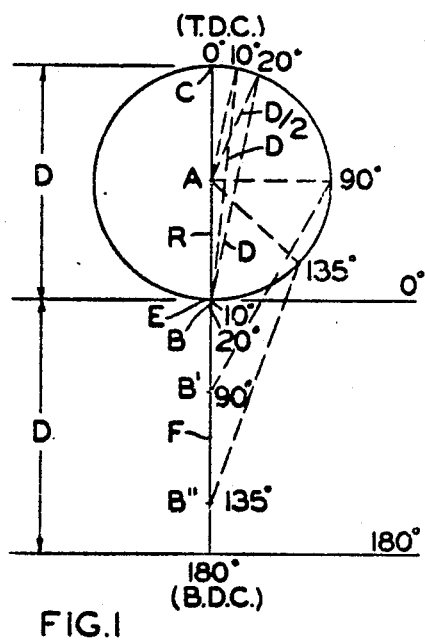
FIG. 1 represents a diagram used for making calculations pertinent to the diagram of the cam of this invention.
Figure 1:
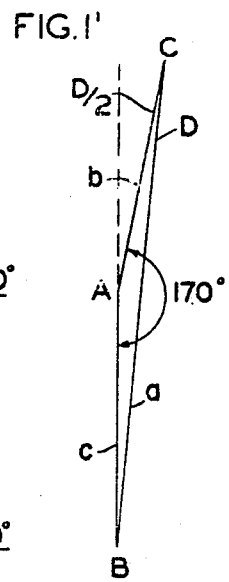

In such an engine using the cam of this invention the centerlines of the pistons and the centerlines of the connecting rods between pistons travel in lines parallel to the axis or centerline of the mainshaft. It is important, in order to avoid vector forces that will give a sideward thrust, that the line of contact points of a bearing against the cam embraces the centerline of a pair of pistons and that the direction of force applied by the bearing against the cam preferably substantially coincides with the centerline of said pair of pistons so as to impart "centerline thrust".

Each of the bearings attached to the connecting rods is maintained in a position so that its axial centerline is pointed in such a direction that the imaginary extension of this centerline intersects the axis centerline of the mainshaft at a 90° angle. This positioning of the bearing is effected by having a potion of the connecting rod slide in a groove which prevents the connecting rod, as well as the pistons connected thereto, from revolving on their respective centerlines or axes. This gives the effect of having the bearing rotate on an imaginary axle which extends to and at a 90° angle to the centerline of the mainshaft. Since the bearing travels upward and downward on the rises and valleys of the cam, this imaginary axle slides up and down on the mainshaft centerline to maintain its 90° angle therewith.

Imagine that the bearing travels on a flat cam surface and rotates on its imaginary axle, the contact points of the bearing comprise a straight line parallel to the axis or centerline of the cylindrical bearing. As the bearing thereafter rotates, each point of that straight line travels the same distance for each revolution of the bearing. However, the radius $R'$ from the centerline of the mainshaft to the outermost point on the line or the outer edge of the bearing is greater than the radius $R''$ from the innermost point on that line or the inner edge of the bearing. This difference in radii comprises the width W of the bearing. Consequently, as the bearing is rotated on its imaginary axle, the circumference of the path of the outermost point on the cam surface has a relationship to $2\pi R'$ and the circumference of the path at the innermost point on the cam surface has a relationship to $2\pi R''$. However, as discussed above, the radius of the circumferential path of the innermost point is shorter than the radius of the circumferential path of the outermost point by the width of the bearing, or in other words, $R'' = R' - W$. Therefore, the innermost point travels a shorter circumferential distance by the amount of $2\pi R' - 2\pi(R' - W)$, or $2\pi R' - 2\pi R' + 2\pi W$, or $2\pi W$ than the circumferential distance traveled by the corresponding outermost point.

Next imagine that the cam surface instead of being flat is a sinusoidal surface in which the slopes of the indentations of the sinusoidal curves of the innermost and the outermost circumferences of the bearing path correspond in slope to that of the sinusoidal curve in the center of the bearing path. In other words, a plane projected from the axis of the mainshaft to any point on the cam will give cross-sections showing the bearing contact area of the cam having the same thickness of the innermost, center and outermost points. The rises and reverse rises will have thicker cam sections than the intermediate sections between rise and reverse rise but the thickness at a particular cross-section will be uniform whether the cross-section is at a rise, reverse rise or any intermediate position.

As a bearing travels on such a sinusoidal cam surface the same principle applies as to the circumferential distances traveled. Thus the path on the cam surface traveled by the innermost edge of the bearing is considerably shorter than the path on the cam surface traveled by the outermost edge of the bearing.

Therefore, since each point on a straight line of contact points described above rotates the same distance for each revolution of the cylindrical bearing, the outer edge of the bearing must travel a greater circumferential distance than the innermost edge of the bearing thereby resulting in friction and binding between the bearing and the cam.

In some of the prior art patents cited above, the bearings are designed in conical shape to compensate for these differences in circumferential distances that the outer and inner edges must travel. However, this method of compensation produces vector forces giving an undesirable outward thrust to the connecting rods and to the pistons.

At each of the rises and reverse rises of the cam of this invention the points of contact of the bearing with the cam comprise a straight line as described above. Between a rise and a reverse rise there needs to be a compensation for the greater distance that the outermost point of the bearing travels compared to the shorter distance that the innermost point of the bearing travels.

In the cam of this invention, the centerline of the contact path between the bearing and the cam is referred to as the centerline sinusoidal curve. The intersection of this sinusoidal curve with the straight line of contact points across the width of a bearing with the cam at the respective rises and reverse rises is consistent throughout the rotation of the bearing. However, between rises and reverse rises, there needs to be an adjustment of the line of contact points across the width of the cylindrical surface of the bearing. As the bearing moves away from a rise, there is a gradual variation in the line of contact points to spirals increasing gradually in variance from the straight line of contact so that as the bearing reaches the midpoint between the rise and reverse rise, the points of contact from its widest spiral line deviation on the surface of the cylindrical bearing with the outermost point on this spiral line being either right or left of center of a straight line on the cylindrical surface passing through the point of contact of the bearing with the center sinusoidal curve and the innermost point of the spiral of contact points is either left or right of said straight line. In other words, the outermost point and the innermost point are on opposite sides of this straight line. The factor determining whether the outermost point is to the right or left of said centerline is whether the bearing is moving up or down the rise, and whether the movement of the cam is clockwise or counterclockwise around the mainshaft.

Then as the bearing moves from this midpoint between the rise and reverse rise, this spiral line of contact points gradually reverses direction until at the time the bearing reaches the reverse rise, the contact points have reverted to a straight line.

As the bearing moves further going up from the reverse rise to the rise, another spiral contact line is formed with the positioning of the points being the reverse of where they were on the way down from the rise to the reverse rise. Again as the bearing passes the midpoint to the rise, the direction of contact points reverses so that gradually the spiral reverts to a straight line of contact points at the top of the rise. This variation of contact points from a straight line to a spiral and then back to a straight line compensates for the greater distance traveled by outermost points on the bearing as compared to innermost points on the bearing. This action is defined herein as "ratio compensation."

It is possible to calculate the cam surface design which will effect "ratio compensation" contact with the respective bearings. This can be done by translation of circular or crankshaft motion to straight line motion using distance or length D equivalent to the stroke or distance of travel of a piston. This method of calculation may be used for the outermost, center and innermost of the contact points on a bearing or any intermediate contact point. Generally the determination of the sinusoidal curves for the outermost and innermost contact points of a bearing with the cam are sufficient and intermediate contact points comprise a gradual transition from the outermost to the innermost points. The sinusoidal curve developed for the outermost contact points has a lesser slope between rise and reverse rise as compared to the sinusoidal curve for the innermost contact points. This difference permits the variations in contact at the innermost and outermost points as compared to each other and to the center points which effects ratio compensation so that between rises and reverse rises the contact points resemble a spiral on the cylindrical surface of the bearing but at the respective rises and reverse rises the contact points form a straight line on the cylindrical bearing parallel to the axis of the bearing.

BEST MODE FOR CARRYING OUT THE INVENTION

Figure 2:
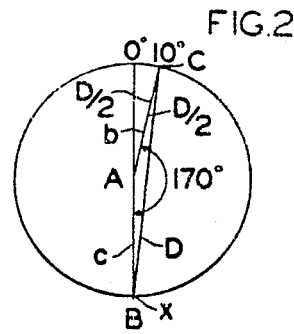
FIG. 2 represents a simplified version of the diagram of FIG. 1.

In FIG. 1 the stroke of the piston is represented as distance "D" which is also the distance from point 0° to point 180° on the circle. D also represents the diameter of the circle. FIG. 1' is an enlarged version of FIG. 1 but isolated on the lines for C having traveled 10° on the circle. FIG. 2 is also isolated on the 10° arc and shows the distance x that point B has traveled on line F. Point C is identified as the point of contact of line b with the circle and point B the point of contact of piston rod R with the circle at zero position. As the wheel or circle is rotated on its center A, the point of contact C moves in a circular path and point B moves downward along the path of line F until when point C has traveled 180° in its circular path, point B has traveled the distance D on its straight line path F. Points B' and B" show the intermediate positions of B at 90° and 135° respectively.

In having a bearing travel from one rise to an adjacent reverse rise (such as from 0° to 90°), the piston travels a cycle or the stroke distance. Then with the bearing traveling to the next rise the piston has reversed to its original position and completed two cycles for one-half revolution of the cam. Therefore there are two cycles of piston movement for each one-half revolution of the cam and the piston travels 10° of its cycle for each 5° of cam revolution. In other words, a bearing covers 5° of the cam for each 10° by the piston. Therefore the distance x which is the vertical distance traveled in 10° of arc of travel will also be the vertical distance a bearing will move in contact with the cam surface through 5° of cam revolution. Likewise, in 20° and 30° of point C movement, the vertical distance moved by the bearing in contact with the cam will be y and z, respectively.

For each 10° arc of travel (or other convenient arc) of the piston through its cycle, the distance for each position of C to the center A of the circle is the radius of the circle or D/2 and the distance from each position of C to the corresponding point of B on line F in each case is D or the stroke distance. The 10° and 20° position are not shown according to scale but are exaggerated for clarity.

In FIG. 2, the 10° arc position is shown with the oblique triangle having D as its longest side, D/2 as its shortest side and the third side equal to D/2 plus the distance traveled by point B on line F of FIG. 1. The obtuse angle in this triangle is 180°-10° or 170°. Knowing this angle and the lengths of two sides of the triangle, it is possible to calculate the length of the third side. The length of this third side of the triangle differs from D/2 by the distance that B has traveled on line F. This also corresponds to the vertical distance x that C has traveled in moving from 0° to 10° on its circular path.

Figure 3:
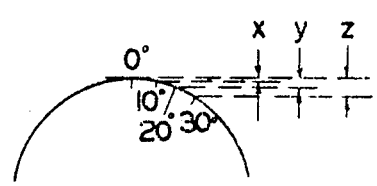
FIG. 3 is a diagram showing progressive vertical distances effected by progressive arc distances in FIG. 1.

Likewise when C has moved in its circular path 20° and 30° respectively, the total vertical distances moved by C will be y and z, respectively. Correspondingly, B will ave moved these same vertical distances respectively along the path of line F. FIG. 3 shows in exaggerated scale how the point of contact point B will travel vertically on a cam surface traveling 10°, 20° and 30°, respectively.

Figure 4:
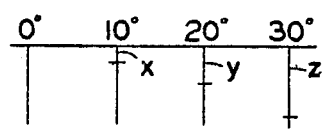
FIG. 4 is an enlarged diagram of a portion of FIG. 3.

The distance x, y, z, etc., shown in FIGS. 3 and 4 also represent the vertical distance that the point C has moved from its original zero position for each of the specific angles or arcs of movement. These also represent the positions of the center of a bearing as it moves the respective arc distances on the sinusoidal cam.

Figure 5:
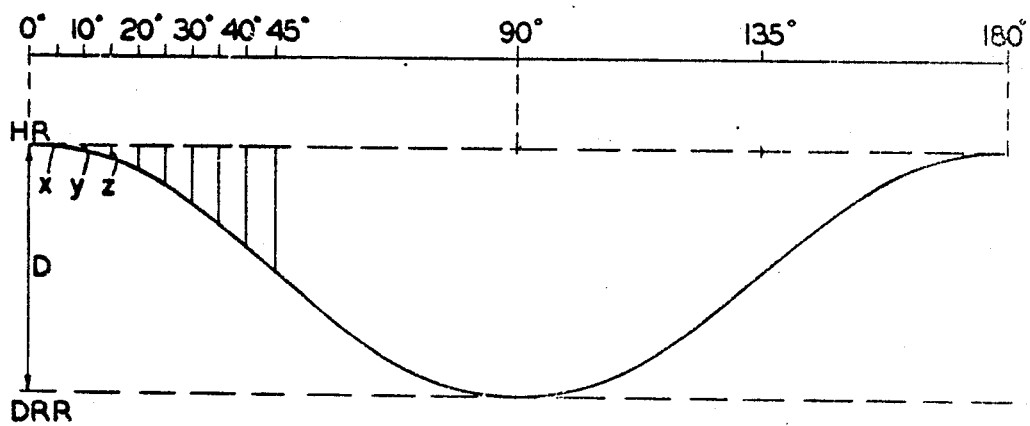
FIG. 5 is a diagram showing the application of the vertical distances of FIG. 3 as applied to a sinsoidal curve.
Figure 19:
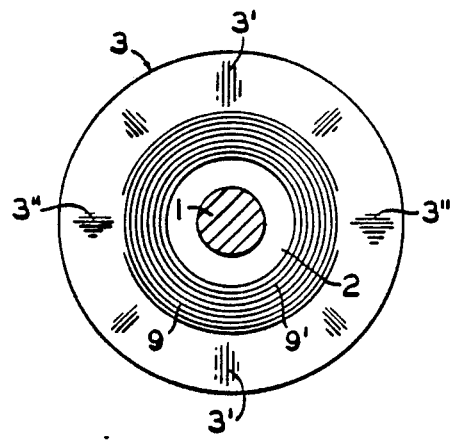
FIG. 19 is a front elevational view of the cam lobe and cam drum as attached to the mainshaft.

FIG. 5 represents a sinusoidal curve with HR representing the high rise positions and DRR representing the depth of the reverse rise positions. This is also a planar representation of a sinusoidal curve through 180°. Increments of 5° each are shown through the first 45°. With 5° of the cam corresponding to 10° of a piston cycle, the corresponding value of x, y, z, etc., may be plotted to give a sinsoidal curve which corresponds to the sinusoidal path of the center of a bearing traveling on the sinusoidal surface of a cam of this invention.

At the top of FIG. 6 a series of circles are drawn with the centers of each circle positioned on a horizontal line. The length of this horizontal line represents 180° of travel on the cam and also represents one-half the circumferential distance, in this case the outer circle of the cam or the contact points of the outer edge of a bearing with the upper cam surface. The positions of these circles are moved progressively 5° to the right for each 10° of movement of the piston which corresponds to 5° of movement on the cam. For each 10° of piston movement through its cycle, a diagram is drawn in accordance with that illustrated in FIGS. 1 and 2 to show the triangles formed by points or angles 1, and 3.

At 0° for both the piston cycle and the cam revolution, the center of the circle for the piston is on a vertical line extending downward from the 0° point and for convenience, the center of the circle representing the center (or axis of the bearing at the outer end or the end which is in contact with the outer edge of the cam) is positioned on this vertical line at a distance corresponding to line c which is the distance between points A and B. As the circles are moved progressively to the right on the horizontal line each successive 5° and the successive arcs for piston movement determined on each respective circle, the points C are determined and the point B (center of bearing) is moved down on the corresponding vertical line a distance equal to the vertical movement of C. In this manner a series of circles are drawn on the horizontal line and the positions of bearing centers are determined by drawing the respective triangles. A line drawn through these bearing center points form a sinusoidal curve and a series of circles are drawn on such sinusoidal curve, each circle having a radius corresponding to the radius of the cylindrical bearing.

The contact point of each circle (in this case the outer edge of the bearing) with the cam is determined by drawing a triangle between three successive center points as shown in the enlarged exaggerated version shown in FIG. 7 where three successive center points are shown as B, B' and B". The largest side of this triangle is the line between the 1st and 3rd points (B and B") and the two shorter sides are between the 1st and 2nd points (B and B') and between the 2nd and 3rd points (B' and B"). A line p is drawn from the 2nd point (B'), which is the center for the middle circle of the three, perpendicular to the longest side of the triangle (from B to B") and extended to B"). The circle shown in FIG. 7 is that which has B' as its center. The point of intersection of this line p with the circle is the point of contact of the bearing with the sinusoidal cam surface.

This procedure is repeated progressively for each successive combination of three circles to determine the tangent or point of contact of the successive circles (or positions of bearing) with the cam surface. These points of contact determine the contour of the cam surface against which the bearing will come in contact.

In the formation of the triangles described above, for determination of the centers of this second or lower series of circles (for positioning a bearing) the side "a" runs from the end of a piston arc to the center of a corresponding circle in this second series of circles. An arc of travel on the cam circumference is indicated by the 5°, 10°, 15°, etc. degree markings at the respective vertical lines and the ends of arcs traveled in a piston cycle indicated by lines marked 10°, 20°, 30°, etc. extending from the appropriate point on the corresponding circle. These respective points 10°, 20°, 30°, etc., represent point C in the respective triangles of FIGS. 1 and 2. The line a drawn from C to B is extended as shown by dotted line a'.

For the circles having piston arcs of 0° and 90°, there is no line a' since it coincides with the vertical centerlines. However as the piston arcs increase from 10° through 90°, the space between a dotted line a' and the closest line used to determine the cam contact point increases progressively until a maximum space is reach at 45° where a" is substituted for a'. This maximum space means that the contact point of the outer circle of the bearing is at a maximum variant from where it is at 0°. Then in progressing form piston circle arcs of 45° to 90°, the space defined between a' the contact-determining line decreases gradually to where at 90° the dotted line a' coincides with the vertical centerline.

Although these a' lines are not projected in each case through completion of the piston cycle, the space between the a' line and the contact-determining line p increases from 90° to maximum at 135° and then decreases gradually from a maximum at 135° to zero space at 180°. This gradual increase in these spaces and then gradual decrease in these spaces represent the "ratio compensation" mentioned above.

Below the above-described second series of circles, there is shown in FIG. 6 a third series of circles which are similarly projected from a horizontal of circles (not shown) which are positioned further below the third series of circles and are projections from the opposite piston joined by a connecting rod and acting in unison with the piston for which projections have been described above. The contact points of the second series of circles with the cam surface determine the contour of the upper surface of the cam at its outer edge and the contact points of the third series of circles with the cam surface determine the contour of the under surface of the cam at its outer edge.

It will be noted that the cam is thickest at 0°, 90° and 180° points of the cam and thinnest at the 45° and 135° points. It will also be noted that the contact points for the circles (or bearing positions) at 45° on the cam are on opposite sides of the 45° vertical centerline. Since the space between two bearings on the same connecting rod remains constant, this means that the thickness of the cam at 45°, 135°, 215° and 315° positions must be correspondingly thinner than the cam at its 0°, 90°, 180° and 270° positions.

FIG. 8 shows similar series of circles developed as in FIG. 6 except that these are for the inner edges of the respective bearings. The horizontal line of centers for the first or top series of circles is scaled for 180° of the circular configuration of the cam taken at the contact points of the inner edge of the bearing with the cam surface. The second or middle series of circles is developed as in FIG. 6 to determine the center points of the upper bearing at various progressive points in the bearing's travel at 5° increments over the cam with the contact points of the inner edge of this bearing on the cam surface determined in the manner described for FIG. 6.

Likewise, the third series of circles and the contact points of the lower bearing on the same connecting rod as for the said upper bearing are determined from a series of horizontally positioned circles (not shown) but also developed in the manner described as for FIG. 6 and the cam surface contact points developed as for FIG. 6.

It will be noted that the slopes of the sinusoidal curves of FIG. 8 are much steeper than for the corresponding curves of FIG. 6. This means that the curves from the rises to the reverse rises and vice versa are much steeper in this case.

At the 45° point on the cam, the triangle is shown for sides a, b and c with the extension of line a shown as dotted line a". The line from the center of the corresponding circle in the second or middle series of circles to the contact point of that circle (or inner bearing edge) with the cam surface is also shown. It will be noted that the space (or angle) between a" and the line determining this contact point is much greater than for the 45° position in FIG. 6.

Although the lines for the respective circles are not drawn in FIG. 8, they may be drawn to show progressive decrease in the space between the extension lines a (not shown) and the contact-determining lines as the circles moves away from the maximum space or angle at the 45° position until they reach the minimum of 0 at the 90° positions. The maximums are again reached at the 135°, 225°and 315° positions and the minimums (or 0) again reached at 180°, 270° and 360° positions.

As described above, this design of the surfaces of the cam of this invention permit full contact as each bearing travels on its circumferential path on the cam and by the spiraling contact described above and its ratio compensation for the inner and outer areas of the bearing as effected by the varying slopes of the sinusoidal surfaces of the cam, the bearings effect rotation of the cam and the mainshaft without the friction that accompanies the use of the sinusoidal cam that has uniform thicknesses in the inner and outer portions of the cam.

In accordance with FIG. 1, for an arc of 45° angle A is equal to 180°−45° or 135°. For a stroke of 1.900 inches, line a of FIG. 1 has a length of 1.900" and b=D/2 or 0.950. Using the equation Sine B/b=Sine A/a of Sine B/0.950=Sine 135°/1.9; Sine B=Sine 135°×2; angle B is determined, and angle C is determined as equal to 180−the sum of angles A and B. Distance C is determined by the formula c/a×sine C/sine A or c/1.9=sine C/sine 135°. The length of travel of the piston from the top dead center point (T.D.C.) to the 45° angle is equal to the difference between c and the radius or c−0.950.

As discussed above with regard to FIG. 1, the maximum piston travel distance is identified as D which, in this case, is also the diameter of the circle traveled by point C. The contact point of the bearing with the cam face may be calculated for the various arcs of travel of point C as described below in connection with FIGS. 12–18.

In FIG. 1, the 0° point is the top dead center point (T.D.C.) and the 180° point is the bottom dead center point (B.D.C.) of the piston stroke or the connection point of the connecting rod with the bearing center. The intermediate positions of this connecting point of bearing center are determined as described for FIGS. 6 and 8. With the bearing center remaining on the centerline of the piston and of the connecting rod, the bearing rises and falls with the upward and downward movement of the piston and connecting rod. This upward downward movement of the bearing causes pressure on the cam surface resulting in rotation of the cam.

To determine the actual contact points of the bearing with the cam surface a number of calculations may be made as described for the determination of line p is GIS. 6 and 7. This is also illustrated below in FIGS. 13, 14, 16, 17 and 18.

FIGS. 9, 10 and 11 illustrate the determination of the location for points A, B and C and the resultant triangles for angles 45°, 90° and 135°. FIG. 9 shows by dotted lines variations in the respective triangles for 5° less and greater than the 45°, namely 40° and 50°, as developed more fully below in connection with FIGS. 12, 13 and 14.

In FIG. 12, a bearing L is shown superimposed on cam J. While the bearing actually remains in the same position except to move up and down vertically, and the cam rotates below or above a particular bearing, this is a matter of relativity and the bearing is depicted here at a 45° angle on the cam. Radial dotted lines are shown for 40°, 45° and 50°. The outer edge of the bearing is identified as 0°, the midpoint of the bearing cylindrical surface as M and the inner edge of the bearing as I. The intercept points of the radial lines for 40°, 45° and 50° are identified as 0′, 0″ and 0‴ respectively. The vertical distance between 0′ and 0″ is identified as x′ and that between 0″ and 0‴ and x″. The x′ and x″ distances also represent distances on the vertical line between 0° and 180° of FIG. 1 that the center of the bearing will travel when the piston and connecting rod connecting point to the bearing has traveled from 40° to 45° and 45° to 50° of the stroke distance.

Since the lengths of these 5° arcs are relatively short, they are approximately equal to a straight line between the respective points. The are distances may be calculated as 5/360 or 1/72 of the appropriate circumference which is $2\pi R$ where R is the radius of the respective circles for the line of contact of the outer edge, middle and inner edge respectively of the bearing with the cam surface. While the cam surface is actually sinusoidal, the circle referred to is considered as one produced by having the contact point of the bearing rotate on a flat surface with the center of rotation being the axis of the cam or the cam shaft. It may also be considered as the outer surface of a cylinder on which the contact points of the particular part of the bearing with the cam surface will be included.

FIG. 13 shows the various distances that the center of a bearing travels (on the vertical 45° line) from 0° to the full stroke at 180° including the various intermediate distances at 40°, 45° and 50°. The vertical distances between the 40° and 45° points and between the 45° and 50° points are identified as x′ and x″ as also described above. The overall vertical distance from 0° to 40° is identified as y′; from 0° to 45° as y″; and from 0° to 50° as y‴. A triangle is defined in the center of FIG. 13 by the horizontal 40° line running from the 40° vertical line to the 50° vertical line; a vertical section on the 50° vertical line running from the 40° horizontal line to the 50° horizontal line; and the hypotenus connects the two unattached ends of the said horizontal and vertical sides. A line is drawn perpendicular to this hypotenus at its intersection with the vertical 45° line. This perpendicular line forms an angle p with the said vertical 45° line and this angle corresponds to the angle P formed between the horizontal 40° line and the said hypotenus. This same triangle is shown in enlarged from in FIG. 14.

In FIG. 14 the length of line 0′ and 0″ is the 5° arc length of FIGS. 12 and 13 and the length of line 0″−0‴ is also a 5° arc length so that triangle side 0′−0‴ is twice the 5° arc length. The vertical side of the triangle is equal to x′ plus x″. Therefore the value of angle P is determined from the equation:

Tangent of $P = (x' + x'')/(\text{twice the } 5° \text{ arc length})$

Thus, as illustrated in FIGS. 15–18, where the stroke or a value is 1.900 inches, the radius or b value if 0.950, the bearing has a width of 0.5 inch and the radius from the center of the cam to the outer edge of the bearing is 3.5 inches, the respective 5° arc lengths are calculated to be 0.1525 at the contact line for the outer edge of the bearing, 0.1416 at the contact line for the middle of the bearing and 0.1307 at the contact line for the inner edge of the bearing. The angle P is 13° 04′ 16″ for the outside, 14° 05′ 02″ for the middle and 15° 16′ 26″ for the inside, with x′+x″ value being 0.71 inch in each case.

This determination of angle P makes it possible to determine also the contact points of the bearing with the cam surface. Thus in FIGS. 16, 17 and 18 the points of contact are identified as X, Y and Z respectively for the outside edge of the bearing, the middle of the bearing and the inner edge of the bearing. Using the respective different circumference for these outside, middle and inner circles, it is possible as described above to determine the value of angle P in each case, and then the distances for X, Y and Z from the 45° line as shown in FIGS. 16, 17 and 18. Thus, as shown in FIGS. 16, 17 and 18 the contact points of the bearing are 0.170 inch from the 45° line for X (the outer edge of the bearing), 0.1825 inch for Y (the middle of the bearing) and 0.198 inch for Z (the inner edge of the bearing). These differences or variances in the distance of these various contact points from the 45° line confirm the fact the contact points on the bearing surface form a spiral line at the 45° point of the cam as compared to the straight line contact effected at the 0°, 90°, 180°, 270° and 360° points of the cam. Between the maximum variance at the 45°, 135°, 225° and 315° points and the adjacent straight line of contact points there is a gradual change from one to the other and the exact contact points for various angles of the cam may be calculated as described above.

The ratio 0.198/0.170 or 1.1655/1 is the compensation that must be accommodated between the outer and inner edges of the bearing because of the difference in respective circle circumferences that the outer and inner edges must travel in its travel over the sinusoidal cam (or the sinusoidal cam under or over the bearing). This ratio compensation is effected by the type of cam surface described herein. This same ratio may be calculated from the respective circumferences, namely 21.966/18.824 or 1.1655/1.

In order to design an appropriate cam lobe it is necessary to have certain information or dimensions predetermined, such as the diameter of the bearings to be used on the cam lobe, the stroke of the piston (or the distance through which the bearings will be pushed by the piston) and possibly the thickness of the cam lobe at the rise or reverse rise of the lobe. The thickness of the cam lobe at this point should be limited substantially to the distance between the closest points of the two bearings that are in contact with the cam lobe, with a minimum amount allowed for clearance.

Obviously the further the contact points are from the axis of the mainshaft, the greater will be the leverage for turning the mainshaft. Since the cam lobe needs be only wide enough to permit contact of the bearings with it, the cam drum may be big enough to occupy most of the space between the mainshaft and the bearing contact area on the cam lobe.

Figure 21:
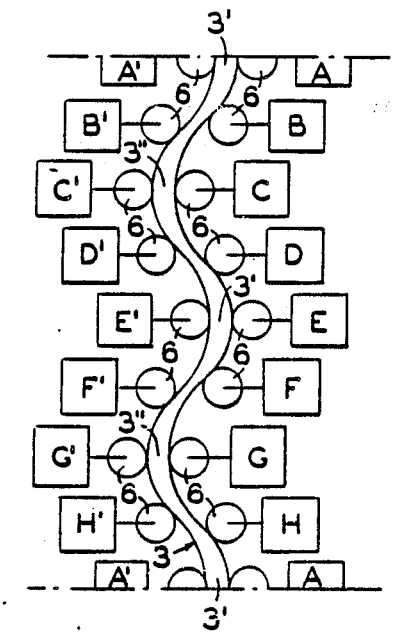
FIG. 21 is schematic view in which the peripheral view of the cylinders, pistons, connecting rod, hearing and cam lobe has been flattened into a single plane.
Figure 20:
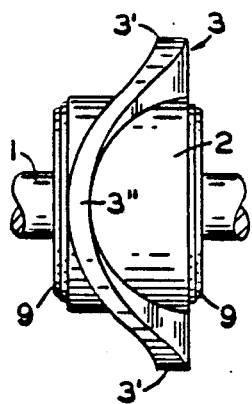
FIG. 20 is a side elevational view of the cam lobe, cam drum and a portion of the mainshaft which are shown in FIG. 19.

For the engine described in U.S. Pat. No. 4,432,310, the schematic layout of FIG. 21 shows the relative positions of the various pistons at a particular instant. In this arrangement pistons A and E are at the top or crest of the cam lobe rise 3' and pistons C' and G' are at the top or crest of reverse cam lobe rise 3". Each of these pistons is in a position for firing and movement carries the bearings 6 off dead center of the cam rises, the movement of the pistons, the connecting rods and the attached bearings will exert force against the cam lobe and thereby cause rotation of the mainshaft.

It will be noted that two cylinders are firing simultaneously, namely A and G'. At the same instant, cylinders B and H' are halfway through the firing cycle. Cylinders C and A' have completed their firing cycles and are ready to start their exhaust cycle, and cylinders E and C' have finished their exhaust cycle and are ready to start the intake cycle, cylinders G and E' have finished their intake cycle and are ready to start the compression cycle. Cylinders H and B' are halfway through their compression cycles.

Figure 22A:
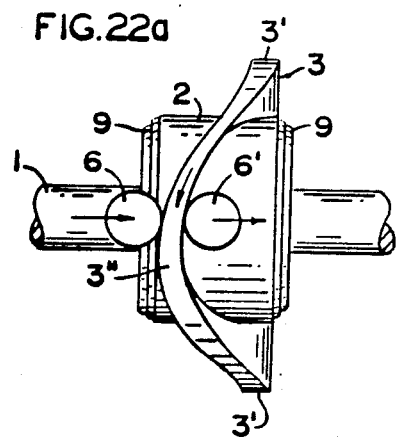
FIGS. 22a, 22b, 22c, 22d, 22e and 22f show side elevational views of the cam lobe and the positioning of the same pair of connecting rod bearings as they travel from a position adjacent to one high rise of the cam lobe in FIG. 2a to a low position in FIG. 22c and then adjacent to the opposite high rise as shown in FIG. 22f, during the course of half of a revolution of the mainshaft.
Figure 22B:
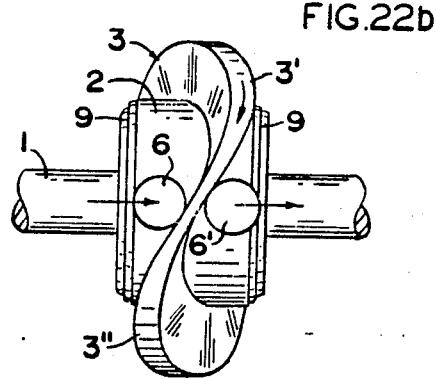
Figure 22C:
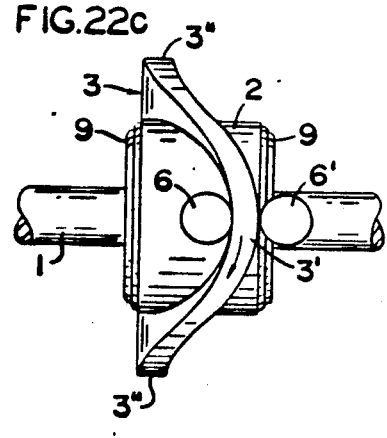
Figure 22D:
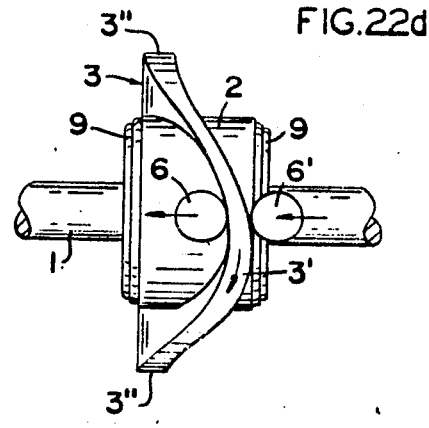
Figure 22E:
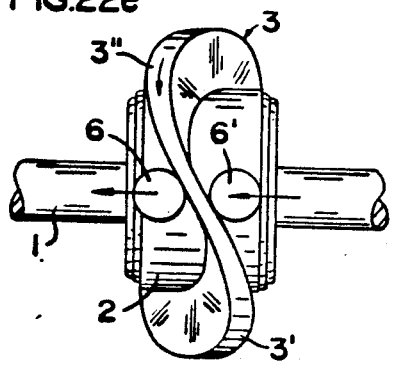
Figure 22F:
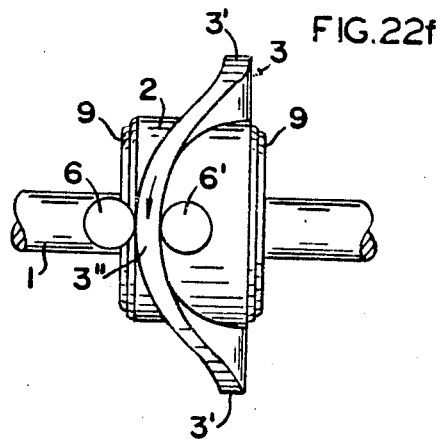

FIG. 22a shows the bearing 6 for piston PA positioned at the top of cam lobe rise 3" just off dead center and ready to start downward thereby exerting force on the cam lobe which will cause mainshaft 1 to rotate. Bearing 6' is under the cam lobe and has just completed its firing cycle travel for piston PA' and is starting its exhaust cycle. FIG. 22b shows a bearing 6 and bearing 6' halfway down their paths with the cam lobe and mainshaft rotated part way. FIG. 22c shows the cam lobe and mainshaft rotated still farther and bearing 6 in its position at the end of the firing cycle for piston PA and bearing 6' is in its final position for exhaust of cylinder A'. FIG. 22d shows bearing 6 starting its exhaust movement upward on the cam lobe and bearing 6' is also starting upward in its intake movement for cylinder A'. FIG. 22e shows bearing 6 and bearing 6' halfway in their upward movement for exhausting cylinder A and intake for cylinder A' respectively. FIG. 22f shows bearing 6 at the top of the opposite rise 3" for completing the exhaust movement of cylinder A and bearing 6' at the top of its intake cycle for completing the intake movement of cylinder A'. FIGS. 22a through FIG. 22f show the movement of bearings 6 and 6' for one-half revolution of the mainshaft. In subsequent movements (not shown), bearing 6 goes through positions for intake and compression of cylinder A taking bearing 6 back to the position of 22a for completion of the cycle and one complete revolution of the mainshaft. In subsequent movements (not shown) of bearing 6", it goes through the compression and firing cycles of cylinder A' taking it also back to the position shown in FIG. 22a.

FIGS. 23a through 23i represent cross-sections of the bearing-contact areas of the cam of this invention taken by planes each coinciding with centerline of the mainshaft and taken at angles of 1°, 22.5°, 45°, 67.5°, 90°, 112.5°, 135°, 157.5° and 180° respectively, these angles being taken in a clockwise direction around the cam. The views shown in FIGS. 23a through 23i are taken with the cam being held so that the axis is in a vertical position. As shown in the respective sections of FIGS. 23a through 23e, the cam portions gradually decrease in thickness from 0° to 45° and then increase gradually from 45° to 90° where the thickness reaches the same as for 0°. Similar decrease to 135° and then increase to 180° are shown in FIGS. 23f to 23i. Moreover, as the transition goes from 0° to 45°, the right side of the respective sections, which right sides are represented by dotted lines since this side is the only side not an outer configuration of the cam lobe, actually extends into the cam. The end points of this dotted line are on the contact line of the inner edges of the bearings in contact with the cam lobe. These decrease in size at a greater rate than the left sides of the respective sections, which left sides represent the outer circumference of the cam lobe and the extremities of the left side line represent the line contacted by the outer edge of the bearings. The dimensions given on FIGS. 23a through 23i are actually dimensions for a cam lobe having a radius of 3,246 inches from the centerline of the bearing path (which also corresponds to the centerline of the piston or connecting rod) to the axis of the cam (as well as axis of the mainshaft). The centerline circumference is 20.985" and the outer and inner circumferences are 21.966" and 18.824" respectively. The bearing used has a 1.5 inch diameter and 0.5 inch width.

The rectangular configurations of FIGS. 23a, 23e and 23i represent the thickness of the contact bearing portions of the cam taken at 0°, 90°, 270° and 360° or in other words, at the respective rises and reverse rises of the cam of this invention. The respective intermediate sectional configurations of FIGS. 23b, 23c, 23d, 23f, 23g and 23h result from the steeper slope of the sinusoidal curve in contact with the inner edge of a bearing as compared to the lesser slope of the sinusoidal curve in contact with the outer edge of the bearing. The dimensions of the various lines shown in FIGS. 23a through 23i are calculated and the accuracy of these measurements is confirmed by cutting the cam in the planes indicated and measuring the dimensions.

FIGS. 24a through 24i show cross-sections at the areas corresponding to those of FIGS. 24a through 24i taken on a cam having sinusoidal surfaces of the type known in the prior art which do not have the ratio compensation feature of the present invention. In this series of the cross-sections created by the respective planes used as FIGS. 23a through 23i at angles of 0°, 22.5°, 45°, etc., are rectangles with the right sides in each case having the same dimension as the left side. While the thickness of these sections decrease from 0° to a minimum at 45° and increase from the minimum at 45° to a maximum at 90°, the dimensions for the two sides are the same in the cross-section for a particular angle. These shapes and dimensions are consistent with the fact that the slopes of the sinusoidal surfaces are the same at the contact points of these with the inner and outer edges of the bearings.

Figure 26:
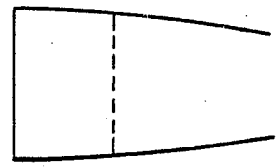

The truncated trapezoid shapes shown in FIGS. 23c and 23q are actually "substantially" trapezoidal in that the sloping sides of the trapezoids are slightly curved. This slight curvature is caused by the fact that the sinusoidal surfaces intersected by the plane described as causing these cross-sections are themselves slightly curved from the outermost region toward the inner area of this cam lobe. This slight curvature is depicted in FIG. 26, which is an extended view of the planar cross-sectional cut taken at 45°, whereas in FIGS. 23c and 23g the sides of the trapezoids are shown as straight lines. In the intermediate cross-sections between these and the rectangular cross-sections of FIGS. 23a, 23c and 23i the sides become more truly straight lines until they eventually form the sides of the rectangles shown in FIGS. 23a, 23e and 23i.

The chart of FIG. 25 shows how the preferred Waller cam, which is designed to duplicate the operation of a crankshaft, does so even though one revolution of the cam effects the same operation as two revolutions of the crankshaft. Crankshaft operation is designed to use the explosion and combustion in a cylinder at as close as possible to the highest compression part of the cycle. Preferably ignition is effected at about 6° before top dead center.

The various increments in the stroke with the crankshaft show that for a corresponding distance of stroke with the cam the crankshaft has travelled twice the number of degrees as for the cam. This duplication of crankshaft operation even though at different numbers of revolution is assured by having the manufacturing equipment for the cam designed to duplicate the variable speed of the crankshaft in the speed with which the advancement and retraction of the cam is effected in the cutting or grinding operation. This is effected by having a fixed hypotenuse in operating the said advancement and retraction which corresponds to the fixed hypotenuse, a piston arm, which drives the crankshaft.

The desire to duplicate crankshaft operation is based primarily on the fact that present cars have corresponding arrangements for values, combustion chamber design, intake and exhaust porting, etc. Therefore duplicating crankshaft operation with the cam of this invention simplifies conversion of automobiles to the engines operated with this cam.

This duplication of the crankshaft operation in the design of the preferred cam accounts for the variations in dimensions and angles of the cross-sections of FIGS. 23. Where it is desired to have more symmetrical dimensions and angles this may be effected by using constant speed throughout the advancement and retraction of the cam in the cutting or grinding operation described below in connection with the apparatus of FIGS. 27-31 and the process for operation of the same.

While the arrangement of the cam drum with respect to the cam lobe and the mainshaft as shown in the drawings and as described above is preferred and is considered more practical and efficient, it is also contemplated that the cam drum may be omitted from its intermediate position between the mainshaft and the cam lobe. If desired, one or more cam drums may be attached to the mainshaft in a different location to provide harmonic balance and to provide support for the cam plates to be attached to the ends thereof, on which cam plates ridge risers may be located for actuating the valve lifters for the intake and exhaust operations.

Nevertheless the design shown in the drawings whereby the cam drum is intermediate between the cam lobe and the mainshaft is preferred since this location requires less space on the mainshaft and provides flywheel action and harmonic balance. Moreover, the cam drum may be solid or partially hollow in accordance with its size and its desired effect.

The cam described herein with specially designed sinusoidal surfaces of the cam lobe is considered to be novel per se. Prior art methods of making cams are similar to the method described in "Machinery's Handbook", pp. 693-710, 21st edition, published by The Industrial Press, New York, N.Y. There is no teaching in the prior art of the ratio compensation features described herein. There are described above methods for determining the exact shape or slope of the sinusoidal curves in various bearing-contact areas of cam or cam lobes.

There have also now been found a simple process and apparatus for producing cams having cam lobes with the sinusoidal surfaces having the ratio compensation features described above. These are described and claimed in applicant's U.S. Pat. Nos. 4,638,547 and 4,639,173 both issued Jan. 27, 1987.

The cam of this invention may have various modifications in addition to those shown above. For example, there may be greater or less thickness in the cam lobe described above. However there are practical limitations. Thus the thickness of a cam lobe between the top of a rise and the closest or opposing reverse rise determines the distance between the pair of bearings attached to a particular connecting rod. Therefore the maximum thickness of the cam lobe at its thickest portion, that is 0°, 90°, 180° and 270°, is determined by the maximum distance the engine can accommodate on the connecting rod between the two bearings. The minimum thickness of the cam at 0°, 90°, etc., is determined by what is the minimum thickness that can be tolerated between the sinusoidal surfaces at 45°, 135°, 225° and 315°.

There may also be variation in the distance from the inner edge of the bearing path on the cam lobe to the center line or axis of the mainshaft. Obviously the greater this distance is the greater will be the leverage for rotating the mainshaft on its axis. Again limitations on the size of the engine provide limitations on the maximum of this distance and the corresponding loss of leverage places a desirable minimum on this distance.

For a particular distance of the bearing path from the mainshaft axis the slopes of the sinusoidal curves at the inner and outer edges of the bearing path as well as the intermediate curves are determined by the distance between two planes both perpendicular to the axis of the mainshaft and one of which planes touches the top of each rise on a sinusoidal surface of the lobe and the other of which planes passes through the lowest point of the reverse rise in the same sinusoidal surface. The greater the distance between these two planes the greater will be the slope in that particular sinusoidal surface.

While the above-referred to variations are within the scope of this invention, it is contemplated that the specific cam lobe described above and in the drawings is considered most efficient for engine design.

In the cross-sections described above and illustrated in FIGS. 23a through 23i, the angle between the sinusoidal surfaces and the outside or annular surface of the cam lobe at 020, 90°, 180° and 270° are in each case 90° as shown by the rectangular structure. At the other cross-sections the corresponding angles are at the top (or left) and at the bottom (or right) as follows: for the 22.5° cross-section, the top angle is 87°29' and the bottom angle is 82°22' for an average of 84°40.5'; for the 45° cross-section, the top angle is 83°9' and the bottom angle is 82°36' for an average of 82°27.5'; for the 67.5° cross-section, the top angle is 85°45' and the bottom angle is 87°22' for an average 86°34'; for the 112.5° cross-section, the top angle is 84°17' and the bottom angle is 87°49' for an average 86°3'; for the 135° cross-section, the top angle is 84°17' and the bottom angle is 83°9' for an average of 83°43.2'; and for the 157.5° cross-section, the top angle is 86°34' and the bottom angle is 85°32' for an average of 86°3'.

It may be seen from these average angle values therefore that there is a sharper overall incline or angle for the 45°, 135°, 225° and the 315° cross-sectional lines than for the intermediate values of 22.5°, 67.5°, etc., as well as the rectangular cross-sections at 0°, 90°, 180° and 270°.

The angles described above for FIGS. 23 may vary slightly from the values actually recited. However when the cutter used in producing the cam (cam therefore the bearings used on the sinusoidal surfaces) have greater or smaller diameters than for those reported above, the variance in angle values may be more substantial.

There may be some questions as to why the values differ for the lengths of the two vertical lines making up the right side of the figure, that is the portions above and below the center line for FIGS. 23b, 23c, 23d, etc. The reason for these difference is that the action of the cutting tool for producing the cam is designed to duplicate the sine action of a standard crankshaft. It is possible by adjustment of the cutting tool action to make the two portions of these lines equal or even reverse the differences. In such latter cases the angles described above will be slightly modified accordingly. In such cases also it is desirable that the diameter of the bearings used on the sinusoidal surfaces and the action of the bearings in relation to the movement of the pistons should be identical to that of the cutting tool used to produce the cam.

In general, however, for the cam lobe as described in FIGS. 23, for the 22.5°, 67.5°, 112.5°, 157.5°, 202.5°, 247.5°, 247.5°, 292.5° and 337.5° cross-section, the average for the top and bottom angles is advantageously in the range of about 84°–87°; and for the 45°, 135°, 225° and 315° cross-sections the average for the top and bottom angles is advantageously in the range of 82°–84°.

However as stated several times previously, the exact angle will be determined by the cutting tool and its action in producing the sinusoidal surface to correspond to the diameter of the bearing to be used and the operation thereof in relation to the piston action.

In FIG. 5 of the drawings there is a planar representation of a sinusoidal curve through 180° of the cam. In other words, the length of the line HR is the linear distance representing ½ of the circumference of a circle running around the cam. If this circle is an imaginary horizontal circle running around the cam at the height of the rises, and another imaginary circle in the same plane as for the first circle is taken inward at a point where the inner edge of a roller bearing will be riding on the sinusoidal surface, this inner circle will have a shorter radius and therefore a shorter circumference. Therefor the line HR for such a circle will have a shorter length representing ½ its circumference. However the dip or distance from line HR to DRR will be the same in both cases. Therefore the sinusoidal curve for this inner circle will have a greater slope because it has to go the same vertical distance within a shorter horizontal distance. These differences in slope are present, although with variations, whether, as described herein, the various imaginary planes intersecting the sinusoidal surfaces produce lines for a rectangular cross-section or for a truncated trapezoid as shown for the present invention.

In summary the cam of this invention may be described as having: a pair of similar axially spaced annular surfaces, each of these surfaces defining sinusoidal paths running in a circular direction, for which sinusoidal paths each includes at least 2 rises and 2 dips (reverse rises) with a dip being equidistant from each adjacent rise and with a dip on one sinusoidal path being opposite a rise on the other sinusoidal path, and these sinusoidal paths each being adapted to have at least one cylindrical bearing travel thereon with the axis of the bearing perpendicular to the axis of the annular surfaces.

Furthermore in this cam the sinusoidal paths each have a lesser slope from rise to dip and from dip to rise at an area more remote from the axis of said annular surface in comparison to a greater corresponding slope in an area thereof closer to the axis of the annular surface with the slopes in intermediate areas increasing progressively and gradually from the said lesser slope to the said greater slope.

Also in this cam the distance between the sinusoidal paths projected on an imaginary plane coinciding with an rotated around the axis of the said annular surfaces varies throughout a circumferential sweep of said plane with the exception of the points between the top of each rise of the sinusoidal path and bottom of each dip on the opposite sinusoidal path. In the cam lobe the said annular surfaces are separated by an annular wall.

In the above-described cam lobe, the opposite sinusoidal paths are adapted to have a pair of bearings arranged with the axis of each bearing lying in a plane passing through the axis of said annular surfaces and secured axially spaced apart for circumferential movement together, one bearing for each sinusoidal path, with each of the said sinusoidal surfaces being adapted to have full line contact across the width of the bearing while said bearing is in contact with the said sinusoidal surface.

In FIGS. 23a, 23e and 23i, as well as in 24a, 24e and the horizontal lines at the top and bottom represent the contact line between the upper and lower surface of a cam lobe having a thickness at the outer edge of the lobe of 1.000 inch and a cylindrical bearing having a width of 0.500 inch across the cylindrical surface of the bearing. The bearing has one cylindrical edge (its outer edge) at the outer edge of the cam lobe and its other (or inner edge) at 0.500 inch in from the outer edge of the lobe. The vertical dotted line in each case is an imaginary line parallel to the vertical outer edge of the lobe and connecting the inner edges of the contact paths of bearings with the cam lobe surface. In the other figures between FIGS. 23a and 23i the imaginary or dotted lines are kept parallel and still 0.005 inch distant from the vertical outer edge of the lobe. The other distances vary according to the distances shown in the respective figures.

With regard to references herein to steeper and lesser slopes, the steepest slope of the cam lobe, for example as shown in FIG. 22a, is at the contact line between lobe 3 and cam drum 9, and the outer edge of the cam lobe has a less steep slope. This difference is shown in a comparison of FIGS. 8 and 6. FIG. 8 shows a steeper slope of the cam lobe at its contact line with the inner edge of a bearing and FIG. 6 shows a lesser slope for the line of contact of the cam lobe with the outer edge of the bearing.

In the discussing above the respective angles such as shown in FIGS. 23a through 23i are in cross-sections of particular cam taken at various points around the circumference of the cam. The angles shown in these figures are taken from a cam held with its axis in a vertical position and the intersecting plane coincides with the axis of the cam and is moved in a clockwise direction about this axis or the intersecting plane is held stationary and the cam is rotated on its axis in a counterclockwise direction.

As previously state, the angles at the top and bottom of the cross-sections of FIGS. 23a through 23i, etc., depend on a number of factors including the diameter of the outer circumference of the cam lobe, the thickness of the lobe or web at the position at which the plane intersects the lobe, the diameter of the cutting or grinding tool used to make the sinusoidal surface, the speed of advancement (variable or constant) and retraction in cutting the cam lobe, and the length of the piston stroke, which latter measurement represents also the radial distance between the imaginary circles both of which have their centers in the axis of the cam, one of which touches the outer edge top of the rises and the other of which touches the outer edge bottom of the reverse rises.

These variations in the respective angles are illustrated by the following table which compares the respective angles shown for the cam whose cross-sections are depicted in FIGS. 23a through 23i with smaller and larger cams, in one case a smaller cam having an outside diameter of 5.000 inches for a stroke of 1.875 inches and a cutting tool having 1,500 inch diameter, and in the other case a larger cam having an outside diameter of 8.750 inches with a stroke of 3.5" inches and made with a cutting tool having a diameter of 2.000 inches. The cam used for the cross-sections of FIGS. 23a through 23i has an outer diameter of 6.992 inches, a stroke of 1.875 inches and was made with a cutting tool having a diameter of 1.500 inches. The angles reported in this table are actual measurements made on the respective cams.

| Circumference Angles | Smaller Cam Cutting Tool 1.5000"dia Cam Outside Dia = 5.000" Stroke = 1.875" | | Cam Shown in FIGS. 23a through 23 Cutting Tool 1.500"dia Cam Outside Dia = 6.992" Stroke = 1.875" | | Larger Cam Cutting Tool 2.000"dia. Cam Outside Dia = 8.750" Stroke = 3.5" | |
|---|---|---|---|---|---|---|
| | Top | Bottom | Top | Bottom | Top | Bottom |
| 0° | 90° | 90° | 90° | 90° | 90° | 90° |
| 22.5° | 87°56' | 82°32' | 87°29' | 82°22' | 88°30' | 89°0' |
| 45° | 85°32' | 77°39' | 83°9' | 82°36' | 86°0' | 84°0' |
| 67.5° | 77°32' | 87°56' | 85°46' | 87°22' | 88.°30' | 84°30' |
| 90° | 90° | 90° | 90° | 90° | 90° | 90° |
| 112.5° | 81°58' | 88°31' | 84°17' | 87°49' | 88°0' | 86°30' |
| 135° | 82°11' | 83°34' | 84°17' | 83°9' | 87°30' | 88°0' |
| 157.5° | 81°01' | 80°41 | 86°34' | 85°32' | 88°0' | 87°30' |
| 180° | 90° | 90° | 90° | 90° | 90° | 90° |

Reference has been made above to the fact that a preferred modification of the cam resembles the action of a crankshaft except that the cam of this invention gives double the action of a crankshaft. In FIG. 1, the circle may represent the revolution of a crankshaft with point E representing the bottom end of the piston rod and point C representing the top of the piston rod. As the crankshaft is revolved, the top of the piston arm follows the circular path shown with a fixed hypotenus D. At first through 10° and 20° of movement there is only a small movement of the bottom of the piston along the vertical path extending downward from B. The points of this bottom B of the piston arm is indicated on this vertical line as 10° and 20°. In FIG. 25 the chart shows that at 30° this distance is only 0.196" of the overall 4' stroke. In the next 30° of travel (from 30° to 60°) on the circle or crankshaft revolution of FIG. 1, the distance travelled by the piston arm bottom is much greater, namely 0.586", and in the next 30° (from 60° to 90°), the travel distance of B is even greater, namely 1.074". From 120° to 180° the rate of travel decreases as shown. Similar increases and decreases are effected by the cam except that corresponding distances are effected in half the degree of revolution of the cam as for the crankshaft.

Figure 27:
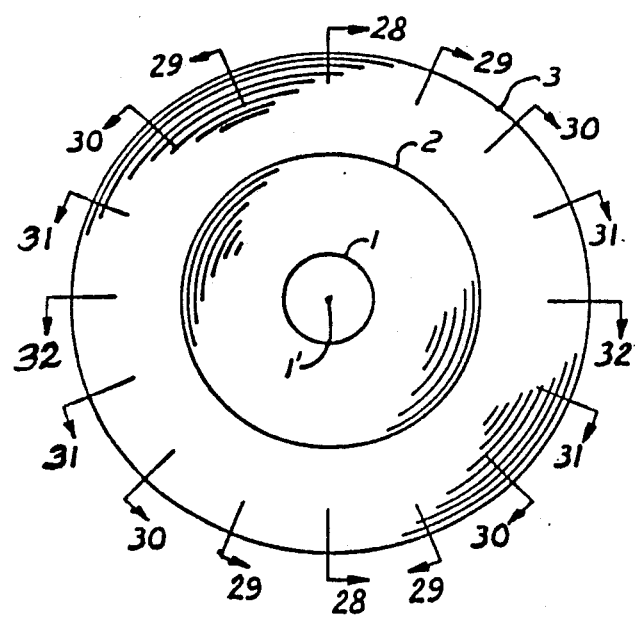
FIG. 27 is a top view of the cam showing the mainshaft 1 surrounded by the cam drum 2 and the sinusoidal cam lobe 3 with the top edges of imaginary planes passing downward and at various respective angles around the periphery of the lobe as shown by the respective lines for cross-sectioning shown as 28—28, 29—29, 30—30, 31—31, and 32—32.

Looking downward in FIG. 27 on the mainshaft 1, longitudinal axis 1', drum 2 and lobe 3, various imaginary planes are shown in lines 33—33, 34—34, 35—35, 36—36 and 37—37 coincident with axis 1' and intersecting the mainshaft, drum and lobe at angles of 0°, 22.5°, 45°, 67.5°, 90°, 112.5°, 135°, 157.5°, and 180° on one side of the lobe and on the opposite side of the lobe intersections at angles of 202.5°, 225°, 247.5°, 270°, 292.5°, 315°, 337.5° and 360° respectively.

Figure 28:
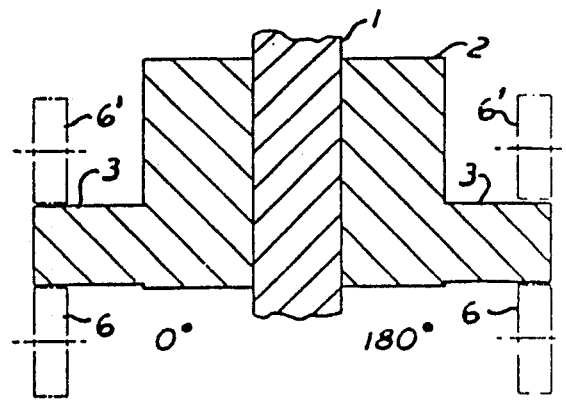
FIG. 28 is a cross-sectional view of the lobe, drum and mainshaft as cut by the imaginary plane 28—28 in FIG. 27 at 0° (and also at 180°).

FIG. 28 shows the cross-section at the line or plane 28—28 of FIG. 27 taken at the angles of 0° and 180° across the lobe. Bearings 6 and 6' are shown in phantom. In this case the cross-section of the lobe at 0° and 180° are shown as three sides of a rectangle with the line of contact of the bearing with the lobe surface being a straight line across the width of the bearing with the bearings shown as flush with the lobe at the intersection lines of this view. The width of the path of the bearing on the lobe is in this and subsequent views the width of the bearing projected downward on the surface of lobe. This path is desirably located at the outer surface, that is farthest from the axis of the mainshaft in order to obtain maximum leverage in turning the mainshaft. The two lines of contact of two bearings in this view are shown as the 0.500 top and bottom lines of the views shown in the FIGS. 23a and 23i. The vertical full line labelled 1,000 in FIGS. 23a and 23i are intersection lines with the outer or radial surface of the lobe. The dotted line labelled 1.000 in FIGS. 23a and 23i are an imaginary line projected through the lobe from one inner edge of one bearing path to the inner edge of the other bearing path which edges are closest to the axis of the mainshaft.

Figure 29:
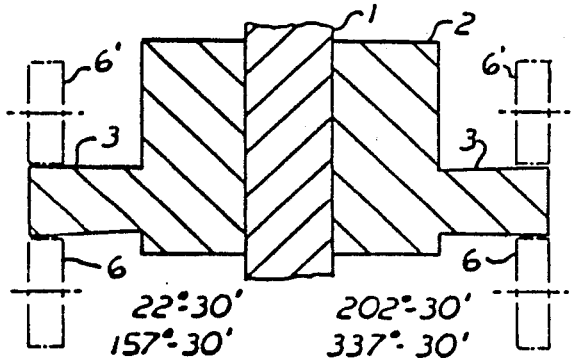
FIG. 29 is a cross-sectional view of the lobe, drum and mainshaft as cut by the imaginary plane 29—29 in FIG. 27 at 22.5° (and also at 157.5°, 202.5° and 337.5°).

FIG. 29 shows the cross-section taken at line or plane 29–29 taken across the lobe at angles of 22.5°, 157.5°, 202.5° and 337.5° which cross-sections are substantially similar to each other. In this case the cross-sections of the lobe are shown as three sides of a truncated trapezoid with the sides of the trapezoid slanted slightly inward in progression from the outermost lobe surface to innermost lobe surface with respect to the axis of the mainshaft. FIGS. 23b and 23h show the cross-sections taken of that portion of the lobe on which the bearings are in contact with the vertical dotted line in FIGS. 23b and 23h representing the imaginary line contacting the innermost edges of the bearing paths through the thickness of the lobe.

Figure 30:
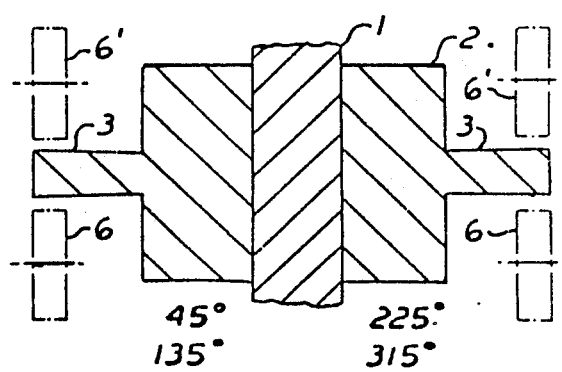
FIG. 30 is a cross-sectional view of the lobe, drum and mainshaft as cut by the imaginary plane 30—30 in FIG. 27 at 45° (and also at 135°, 235° and 315°).

FIG. 30 shows the cross-section taken at line or plane 30—30 taken across the lobe at angles of 45°, 135°, 235° and 315°, which cross-sections are substantially similar to each other. Here again the cross-sections are shown as three sides of a truncated trapezoid with the sides of the trapezoid slanted inward in progression from the outermost lobe surface to innermost lobe surface with respect to the axis of the mainshaft. FIGS. 23c and 23g show the cross-sections taken of that portion of the lobe taken between the two bearing paths at 45° and 135°.

Figure 31:
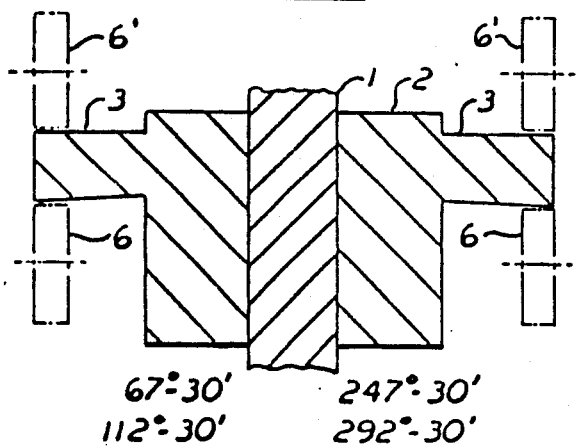
FIG. 31 is a cross-sectional view of the lobe, drum and mainshaft as cut by the imaginary plane in 31—31 in FIG. 27 at 67.5° (and also at 112.5°, 257.5° and 292.5° ).

FIG. 31 shows the cross-section taken at lines or planes 31—31 taken across the lobe at angles of 67.5°, 112.5°, 257.5° and 292.5° which cross-sections are substantially similar to each other. Here again the cross-sections are shown as three sides of a truncated trapezoid with the sides of the trapezoid slanted inward in progression from the outermost lobe surface to innermost lobe surface with respect to the axis of the mainshaft. FIGS. 23d and 23f show the cross-sections taken of that portion of the lobe taken between the two bearing paths at 67.5° and 112.5°.

Figure 32:
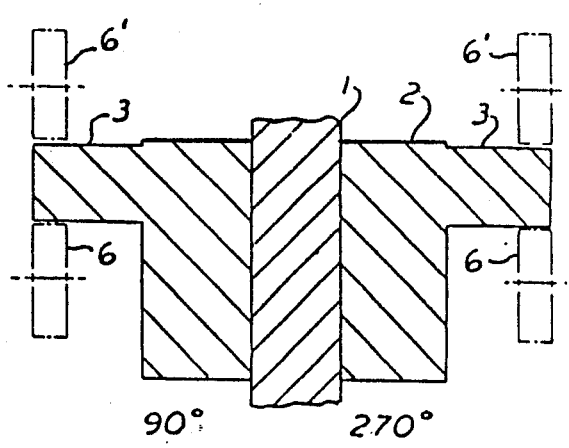
FIG. 32 is a cross-sectional view of the lobe, drum and mainshaft as cut by the imaginary plane 32—32 in FIG. 27 at 90° (and also at 270°).

FIG. 32 shows the cross-section taken at line or plane 32—32 taken at angles of 90° and 270°. Here the cross-sections of the lobe are shown to be three sides of a rectangle with two sides being of the intersection of the plane 37—37 with the lobe surface progressing from the outermost lobe surface to the innermost lobe surface. With respect to the axis of the mainshaft. A third rectangular side is the intersection of plane 37—37 with the annular surface of the lobe. FIG. 23e shows the cross-section taken of that portion of the lobe taken between the two bearing paths at 90° with the dotted line of the rectangle being provided by the imaginary line drawn between the two innermost edges of the bearing paths.

Figure 33:
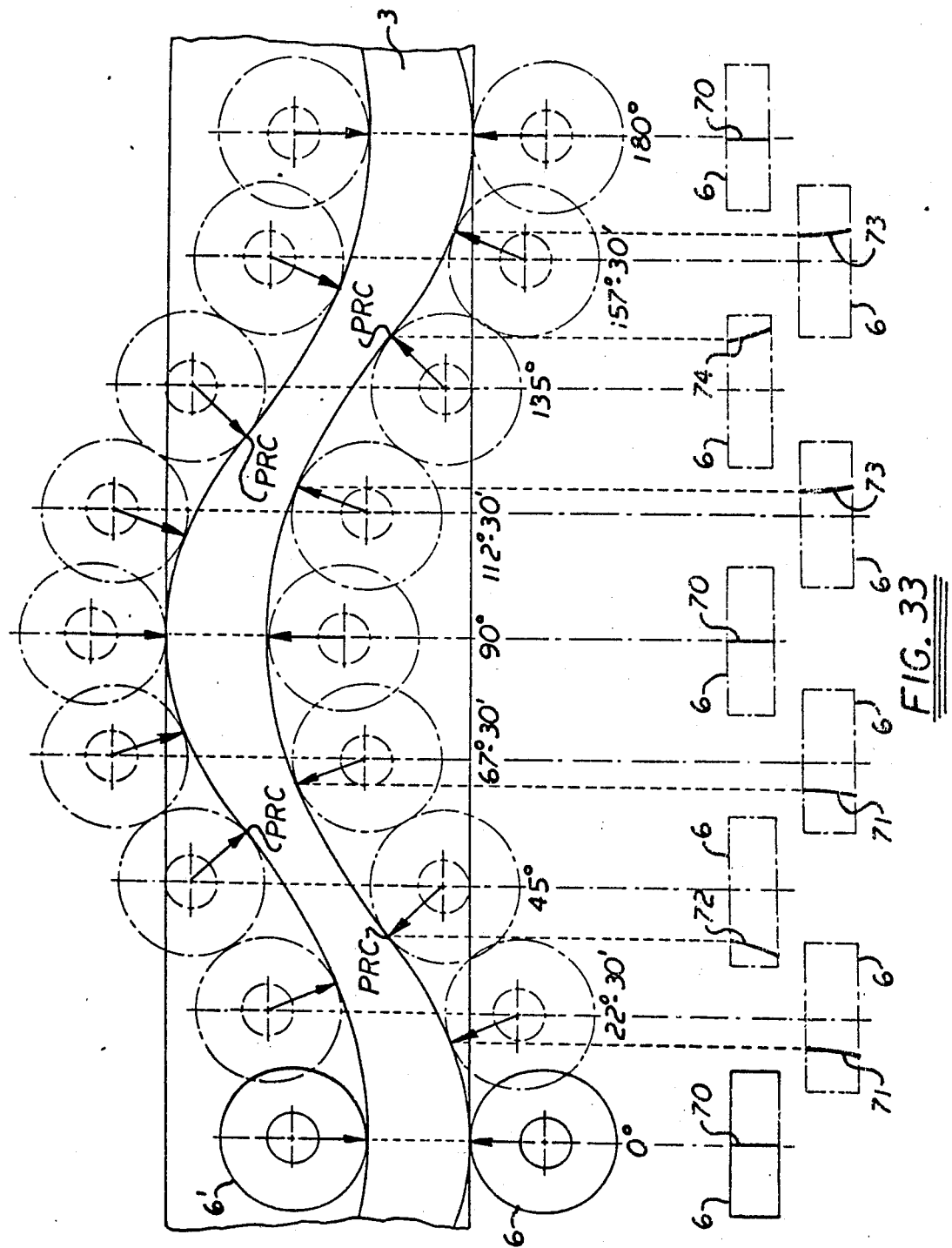
FIG. 33 is a side elevational view of the cam lobe 3 projected in a flat plane with a pair of cylindrical bearings 6 and 6' positioned at 0°, one below and one above the sinusoidal lobe and in phantom the same bearings projected in different positions with respect to the lobe as the lobe passes between the bearings, and shown below are the views of the bearing in the various positions turned 90° to show the width of the bearing 6 and the line of contact across the width of the bearing as the lobe passes to various positions between the bearings.

FIG. 33 is a side elevational view of cam lobe 3 projected in a flat plane with a pair of cylindrical bearings 6 and 6' positioned at 0° on the lobe. Then in phantom the same bearings are projected in different positions with respect to the lobe as the lobe passes between the bearings. P.R.C. represents points of reverse curvature on the two bearings at which the curvature of the lines of contact between bearings and lobe surface change curvatures, which events occur at 45° and 135° (as well as 135° and 215°—not shown).

Also, FIG. 33 shows each of the bearings turned at angle of 90° to show the surface of the bearing which is in contact with the lobe surfaces. In each case a dotted line is drawn running through the centers of the two bearings and projected downward to the center of the bearing shown as turned 90°. At 0°, 90° and 180° (as well as 270°—now shown) these lines of contact are straight lines across the width of the bearings. These straight lines of contact coincide with the extended dotted lines passed through the centers of the two bearings. At positions of 22°30' and 67°30' the lines of contact between the bearing and the lobe surface are full across the width of the bearing but are of slight, spiral curvature across the width of the bearing. These curved contact lines are to the left of the projected center lines. The lines of contact for 45° and 135° are more pronounced curves and farther away from the projected center lines, with the curved line for the 45° position being further to the left of the projected center line than is the case with the 22°30 and 67°30' curved. The curved line of contact for 135° is on the right side of the projected center line and is away from the center lines for 112°30' and 157°30'. The curved lines of contact for 112°30' and 157°30' are also to the right of the projected center line and have less pronounced curvature than the line of contact for 135°.

In FIGS. 29 and FIG. 31 the lines of contact between the bearings and the cam lobe surfaces are not shown directly at the intersection line of the plane with the lobe surface and this is even more pronounced in FIG. 30 with greater distances shown in this view between the bearing and lobe surface. Actually the contact is being made beyond these views as illustrated in FIG. 33 where the lines of contact are on one side or the other with respect to the projected center lines between the centers of the bearings. It is only at 0°, 90°, 180° and 270° that the contact lines between bearings and lobe surface coincide with the center line between the two bearings.

Figure 34A:
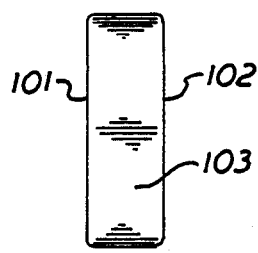
FIGS. 34a, 34b and 34c are top, front and side views respectively of a typical roller bearing used on the sinusoidal surfaces of the cam of this invention.
Figure 34B:
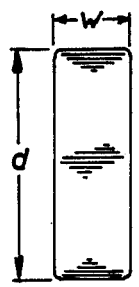
Figure 34C:
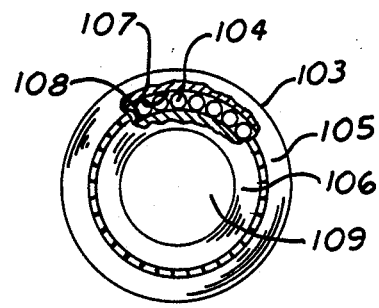

FIGS. 34a, 34b and 34c illustrate a typical bearing used on the sinusoidal surfaces of the cam of this invention. In a preferred modification the width w is 0.5 inch and the diameter d is 1.5 inches. The width is the distance between the two outer edges 101 and 102 of the cylindrical surface 103. The side view of FIG. 34c shows a partial broken section which shows the needle rollers 104 which are positioned between the outer ring portion 105 and inner ring portion 106 so that outer ring portion 105 can rotate freely on inner ring portion 106. A recess is formed between the inner and outer ring portions to retain the needle rollers in position, this recess shown in part as wall 107 in the outer ring and wall 108 in the inner ring. Opening 109 is provided in the inner ring portion 106 to receive a supporting shaft or axle whose axis is the axis about which the outer ring 105 may be freely rotated.

Figure 35A:
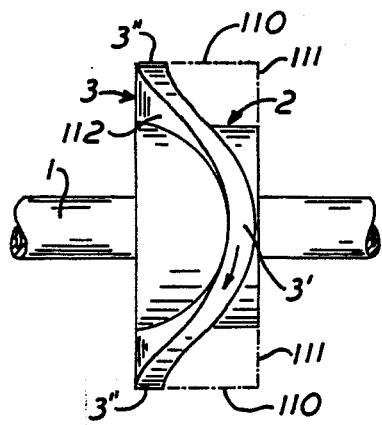
FIGS. 35a, 35b and 35c are top, front and side views of a cam of this invention with dotted lines showing in phantom the cylinder from which the cam is cut.
Figure 35B:
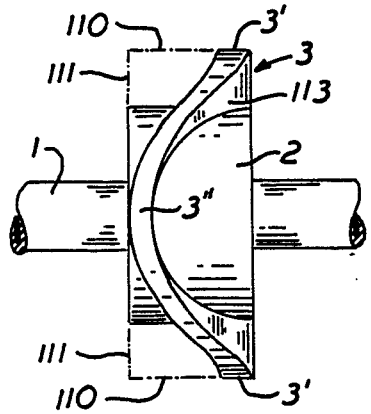
Figure 35C:
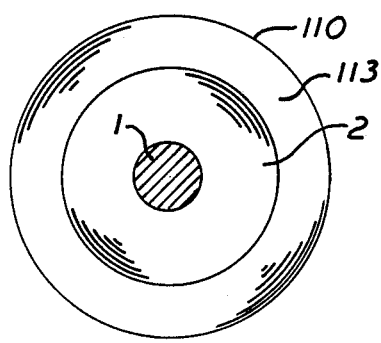
Figure 36A:
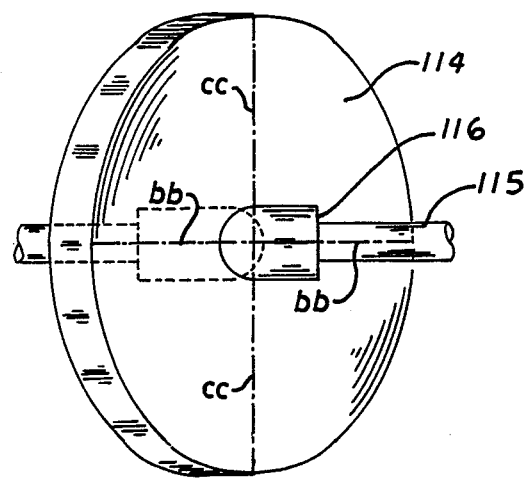
FIGS. 36a, 36b and 36c are top, front and side views of the plate arrangement used to make the cam plate of Swiss Pat. No. 126,887.
Figure 36B:
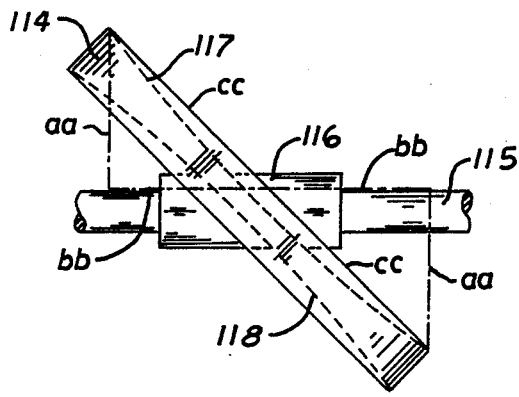
Figure 36C:
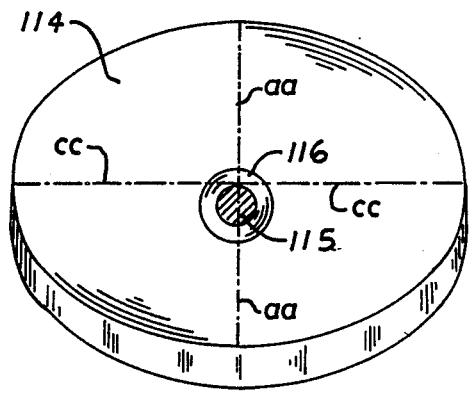

FIGS. 35a, 35b and 35c show the cam of this invention with two rises 3" and 3" and two reverse rises 3' and 3' with dotted lines 110 and 111 showing in phantom the cylindrical block from which the cam is cut to provide the two sinusoidal surfaces 112 and 113. As shown in applicant's U.S. Pat. Nos. 4,638,547 and 4,639,173, the cam of this invention is derived by cutting out portions from the flat ends of the cylindrical block to provide the two sinusoidal surfaces, the two rises and the two reverse rises are defined here.

In the original cylindrical block from which the cam of this invention is cut each point on the outer cylindrical surface is the same distance from the longitudinal axis of the cylinder as measured by a line extended perpendicularly from the longitudinal axis to the particular point. When the cam is cut from this cylindrical block to produce the cam of this invention, the remaining cylindrical surface has the same property, namely each point on the outer periphery or outer cylindrical surface is the same fixed distance from the longitudinal axis or axis of rotation as any other point on the outer cylindrical or peripheral surface as measured by a line extended perpendicularly from the longitudinal axis or axis of rotation to the particular point. Moreover this distance remains fixed all during rotation of the cylindrical configuration.

While certain features of this invention have been described in detail with respect to various embodiments thereof, it will of course be apparent that other modifications can be made within the spirit and scope of this invention and it is not intended to limit the invention to the exact details shown above except insofar as they are defined in the following claims.

The invention claimed is:

1. A cam having:
   (a) a generally cylindrical outer configuration having an outer cylindrical surface and having a longitudinal axis about which axis said cam is capable of rotating, during which rotation each point on said surface is a fixed distance from said axis as measured by a line drawn perpendicularly from said axis to said point;
   (b) two separate sinusoidal surfaces running in a circular direction around the said axis of said cylindrical outer configuration, the width of said sinusoidal surfaces extending from the outer cylindrical surface for a substantial distance in a direction toward the axis of said cylindrical configuration, said substantial distance being sufficient to accommodate having a cylindrical bearing ride thereon, the two sinusoidal surfaces being separated from each other by an annular cam lobe, said sinusoidal surfaces being adapted to have cylindrical bearings travel thereon in circular paths having the same axis of said circular paths, said circular path axis coinciding with the said axis of said cylindrical configuration;
   (c) each of said sinusoidal surfaces having two rises and two reverse rises, each reverse rise being equidistant from each adjacent rise and each reverse rise in each sinusoidal surface being directly opposite to a rise in the other separate sinusoidal surface;
   (d) the said sinusoidal surfaces each having a lesser slope from rise to reverse rise and from reverse rise to rise in an area more remote from the axis of said cylindrical configuration as compared to a greater slope in an area of said sinusoidal slope closer to said axis of said cylindrical configuration with the slopes between said lesser and greater slopes increasing progressively and gradually from said lesser slope to said greater slope; and
   (e) imaginary planes passed through and coincident with the axis of said cylindrical configuration intercepting the said annular cam lobe formed between the said sinusoidal surfaces at various angles around the said outer cylindrical surface of said lobe, with the cross-section of the contact areas on the cam lobe of a cylindrical bearing riding on the cam lobe at the respective rise and reverse rises comprising at the said contact areas two parallel sides of a rectangular shape and the respective cross-sections at the midway points between a rise and an adjacent reverse rise comprising two sloping sides of substantially a truncated trapezoid with the cross-sections intermediate between said cross-section at the midway point and each said rise cross-section and each said reverse rise cross-section changing gradually from substantially said truncated trapezoid to said rectangular shape as the respective planes progress from said midway point between a rise and a reverse rise, the line of intersection of said imaginary planes with the said outer cylindrical surface of said lobe comprising a third side making right angle connections with the two parallel sides of said rectangular shape and forming the base of said truncated trapezoid.

2. The cam of claim 1 in which each of said sinusoidal surfaces is adapted to have full line contact across the width of said cylindrical bearing in contact therewith while said cylindrical bearing is rotating on an axis whose line of projection maintains a perpendicular relationship with the axis of the cam with said cylindrical bearing travelling in a circular path around said cam axis and travelling in a path on said sinusoidal surface.

3. A cam having:
   (a) a generally cylindrical outer configuration having an outer cylindrical surface and having a longitudinal axis;
   (b) two separate sinusoidal surfaces running in a circular direction around the said axis of said cylindrical configuration, said sinusoidal surfaces having a width extending from the said outer cylindrical surface for a substantial distance in a direction toward the axis of said cylindrical configuration, said substantial distance being sufficient to accommodate having cylindrical bearings ride thereon, said sinusoidal surfaces having separated from each other by an annular lobe and said sinusoidal surfaces being adapted to have cylindrical bearings travel thereon in circular paths having the axis of said circular paths coinciding with the axis of said cylindrical configuration;
   (c) each of said sinusoidal surfaces having two rises and two reverse rises, each reverse rise being equidistant from each adjacent rise and each reverse rise in each sinusoidal surface being directly opposite to a rise in the opposite sinusoidal surface;
   (d) the said sinusoidal surfaces each having a lesser slope from rise to reverse rise and from reverse rise to rise in an area more remote from the axis of said cylindrical configuration as compared to the greater corresponding slope in an area of said sinusoidal slope closer to said axis of said cylindrical configuration with the slopes in intermediate areas increasing progressively and gradually from said lesser slope to said greater slope; and
   (e) in which each of said sinusoidal surfaces is adapted to have full line contact across the width of a cylindrical bearing in contact therewith while said bearing is rotating on an axis whose line of projection maintains a perpendicular relationship with the axis of the cam with said bearing travelling in a circular path around said cam axis and travelling in a path on said sinusoidal surface.

4. The cam of claim 3 in which imaginary planes passed through and coincident with the axis of said cylindrical configuration intercept the cam lobe formed between the said two separate sinusoidal surfaces at various angles around the periphery of said lobe, with the cross-section of the contact areas on the cam lobe of a cylindrical bearing riding on the cam lobe at the respective rises and reverse rises comprising at the outer surfaces of the cam two parallel sides of a rectangular shape and the respective cross-section at the midway points between a rise and an adjacent reverse rise comprising two sloping sides of substantially a truncated trapezoid with the base line of said trapezoid being in the annular periphery of said cam lobe, with the cross-sections intermediate between said midway cross-section and each said rise cross-section and said reverse rise cross-section changing gradually from substantially a truncated trapezoid to said rectangular shape as the respective planes progress from said midway point to a rise and reverse rise.

5. A cam having:
(a) a pair of similar axially spaced annular sinusoidal surfaces;
(b) each of said surfaces defining sinusoidal paths running in circular direction said sinusoidal surfaces being separated from each other by an annular lobe;
(c) said sinusoidal paths each having two rises and two dips with each dip being equidistant from each adjacent rise and with each dip on one sinusoidal path being opposite a rise on the other sinusoidal path;
(d) said sinusoidal paths each adapted to have at least one cylindrical bearing travel thereon with the axis of the said cylindrical bearing perpendicular to the axis of said annular surface.
(e) said sinusoidal paths each having a lesser slope from rise to dip and from dip to rise at an area more remote from the axis of said annular surface in comparison to a greater corresponding slope in an area thereof closer to the axis of said annular surface with the slopes of intermediate areas between said remote area and said closer area increasing progressively and gradually from said lesser slope to said greater slope; and
(f) each of said sinusoidal surfaces is adapted to have cylindrical bearings rotate and move circumferentially thereon and in full line contact across the width of said cylindrical bearings while the said cylindrical bearings are in contact with the said sinusoidal surfaces.

6. A cam according to claim 5 wherein the opposite sinusoidal paths are adapted to have at least one pair of cylindrical bearings arranged with the axis of rotation of each said bearing lying in a plane passing through the central axis of said annular surfaces and secured axially spaced apart for circumferential movement together, one said bearing of each said pair for each sinusoidal path, with each of the said sinusoidal surfaces being adapted to have full line contact across the width of the said bearings while said bearings are in contact with the said sinusoidal surfaces.

* * * * *

UNITED STATES PATENT AND TRADEMARK OFFICE
CERTIFICATE OF CORRECTION

PATENT NO. : 4,979,406                                     Page 1 of 2

DATED      : Dec. 25, 1990

INVENTOR(S): Francis E. Waller

It is certified that error appears in the above-identified patent and that said Letters Patent is hereby corrected as shown below:

On the title page, item [75], the inventor's address should be corrected from "Oldsmar" to read "2559 Highland Acres Drive, Clearwater, Florida 34621".

Col. 1, line 18, delete "application".
Col. 3, line 28, correct "am" to read "cam".
Col. 3, line 38, correct "an" to read "and".
Col. 7, line 15, correct "potion" to read "portion".
Col. 10, line 17, correct "ave" to read "have".

Col. 13, line 57, correct "and" to read "as".
Col. 13, line 65, correct "are" to read "arc".
Col. 14, line 29, correct "from" to read "form".
Col. 14, line 41, correct "if" to read "is".
Col. 16, line 47, correct "3246 inches" to read "3.246 inches".
Col. 19, line 47, correct "difference" to read "differences".
Col. 20, line 48, correct "an" to read "and".
Col. 21, line 39, correct "discussing" to read "discussions".
Col. 21, line 49, correct "state" to read "stated".

UNITED STATES PATENT AND TRADEMARK OFFICE
CERTIFICATE OF CORRECTION

PATENT NO.   :   4,979,406

DATED        :   Dec. 25, 1990

INVENTOR(S)  :   Francis E. Waller

It is certified that error appears in the above-identified patent and that said Letters Patent is hereby corrected as shown below:

Col. 26, line 46, correct "having" to read "being".

Signed and Sealed this

Fifth Day of May, 1992

*Attest:*

DOUGLAS B. COMER

*Attesting Officer*     Acting Commissioner of Patents and Trademarks